(12) United States Patent
Dolan et al.

(10) Patent No.: US 8,688,878 B1
(45) Date of Patent: Apr. 1, 2014

(54) DATA STORAGE SYSTEM MODELING

(75) Inventors: Sean C. Dolan, Belmont, MA (US); Hui Wang, Upton, MA (US); Marik Marshak, Newton, MA (US); Xiaomei Liu, Natick, MA (US); Owen Martin, Hopedale, MA (US); Alexandr Veprinsky, Brookline, MA (US); Ahmet Kirac, Guttenberg, NJ (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/538,245

(22) Filed: Jun. 29, 2012

(51) Int. Cl.
*G06F 7/00* (2006.01)

(52) U.S. Cl.
USPC .............................................. 710/74; 710/33

(58) Field of Classification Search
None
See application file for complete search history.

(56) References Cited

U.S. PATENT DOCUMENTS

| | | | |
|---|---|---|---|
| 6,269,410 B1* | 7/2001 | Spasojevic | 710/5 |
| 7,035,970 B1* | 4/2006 | Zahavi | 711/114 |
| 7,039,897 B2* | 5/2006 | Anderson et al. | 717/104 |
| 7,065,624 B1* | 6/2006 | Zahavi | 711/170 |
| 7,640,231 B2* | 12/2009 | Alvarez et al. | 1/1 |
| 7,747,986 B2* | 6/2010 | LaVigne et al. | 717/128 |
| 2002/0177989 A1* | 11/2002 | Alvarez et al. | 703/22 |
| 2005/0125213 A1* | 6/2005 | Chen et al. | 703/22 |

OTHER PUBLICATIONS

Dolan, Sean C., et al., "Performing Data Storage Optimizations Across Multiple Data Storage Systems", U.S. Appl. No. 13/466,775, filed May 8, 2012.
Kirac, Ahmed, et al., "Techniques for Automated Discovery of Storage Devices and Their Performance Characteristics", U.S. Appl. No. 13/435,462, filed Mar. 30, 2012.
Marshak, Marik, et al., "Techniques for Automated Discovery and Performing Storage Optimizations on a Component External to a Data Storage System", U.S. Appl. No. 13/435,415, filed Mar. 30, 2012.
Marshak, Marik, et al., "Techniques for Modeling Disk Performance", U.S. Appl. No. 12/924,361, filed Sep. 24, 2010.

* cited by examiner

*Primary Examiner* — Cheng-Yuan Tseng
(74) *Attorney, Agent, or Firm* — Muirhead and Saturnelli, LLC

(57) ABSTRACT

Described is data storage system modeling. Received at a first data storage system is information representing a workload for I/O operations directed to a logical devices having storage provisioned on physical devices of a second data storage system. Information representing the workload may be obtained by performing discovery processing to discover performance characteristics of the physical devices of the second data storage system. Discovery processing may include receiving, at the first data storage system, I/O operations from a client directed to the set of one or more logical devices having storage provisioned on the physical devices of the second data storage system. The I/O operations are then issued to the second data storage system. In response, performance data is obtained at the first data storage system representing the workload for the plurality of I/O operations. Performance of the second data storage system is modeled in accordance with the workload.

20 Claims, 22 Drawing Sheets

DATA STORAGE SYSTEM MODELING

BACKGROUND

1. Technical Field

This application generally relates to data storage, and more particularly to techniques used in connection with data storage system modeling.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes (LVs). The logical disk units may or may not correspond to the actual disk drives. Allowing multiple host systems to access the single storage device unit allows the host systems to share data stored therein.

In connection with data storage, a variety of different technologies may be used. Data may be stored, for example, on different types of disk devices and/or flash memory devices. The data storage environment may define multiple storage tiers in which each tier includes physical devices or drives of varying technologies, performance characteristics, and the like. The physical devices of a data storage system, such as a data storage array, may be used to store data for multiple applications.

SUMMARY OF THE INVENTION

In accordance with one aspect of the invention is a method of data storage system modeling. At a first data storage system, information is received representing a workload for performing I/O operations directed to a set of one or more logical devices having storage provisioned on a set of one or more physical devices of a second data storage system, wherein at least some of the information representing the workload is obtained by performing discovery processing to discover performance characteristics of the set of one or more physical devices. Discovery processing includes: receiving, at the first data storage system, a plurality of I/O operations from a client directed to the set of one or more logical devices having storage provisioned on the set of physical devices of the second data storage system; issuing, by the first data storage system to the second data storage system, the plurality of I/O operations; and obtaining, at the first data storage system in response to said issuing, a set of performance data representing the workload for the plurality of I/O operations directed to the set of logical devices having storage provisioned on the set of one or more physical devices of the second data storage system. Performance of the second data storage system is modeled in accordance with the workload. The plurality of I/O operations may include non-exploratory I/O operations from the client, the non-exploratory I/O operations may include at least some write operations and at least some read operations. The modeling may include modeling performance of one or more front-end components of the second data storage system and one or more back-end components of the second data storage system. The method may include obtaining a plurality of input data sets for a plurality of consecutive minor measurement time periods, each of said plurality of input data sets including performance data corresponding to a different one of the plurality of consecutive minor measurement time periods, each of said plurality of inputs data sets including performance data for I/Os directed to the set of one or more logical devices having storage provisioned on the second data storage system; and generating, using the plurality of input data sets, a set of major measurements for a major measurement time period including the plurality of consecutive minor measurement time periods, said set of major measurements representing back end read activity data and back end write activity data of the second data storage system directed to the set of one or more logical devices. Each of the plurality of input data sets may include a plurality of performance metrics obtained by observing performance on the first data storage system in response to issuing I/Os to the set of one or more logical devices. Each of the plurality of inputs data sets may include an average read response time, an average read data transfer rate, an average read throughput in terms of a number of I/O operations per unit of time, an average write response time, an average write data transfer rate, and an average write throughput in terms of a number of I/O operations per unit of time. The plurality of consecutive minor measurement time periods may include a focal minor measurement time period and the plurality of consecutive minor measurement time periods may be partitioned into a pre-range portion of the plurality of consecutive minor measurement time periods preceding the focal minor measurement and a post-range portion of the plurality of consecutive minor measurement time periods subsequent to the focal minor measurement time period. The back end read activity data may be the average read response time, the average read data transfer rate, and the average read throughput in terms of a number of I/O operations per unit of time of one of the plurality of input data sets corresponding to the focal minor measurement time period. The back end write activity data may be determined in accordance with a back-end write status, wherein the back-end write status is any of uncertain if there is a delayed write occurring in any minor measurement time period of the pre-range portion, sustainable if there is no delayed write in any of the plurality of consecutive minor measurement time periods, and unsustainable if there is no delayed write in the pre-range portion and there is a delayed write in any of the post range portion and focal minor measurement time period. The back-end write activity data may be determined using one or more of the plurality of input data sets selected based on the back-end write status. Second processing may be performed if the back-end write status is any of uncertain or sustainable. The second processing may include selecting a first portion of the plurality of input data sets, said first portion including a first of the plurality of input data sets corresponding to the focal minor measurement time period, wherein the first portion also conditionally includes one or more of the plurality of input data sets corresponding to minor measurement time periods in the post-range portion if the average write data transfer rate and the average write throughput for each of the one input data sets corresponding to a minor measurement time period of the post-range portion are less than corresponding values in the one input data set corresponding to the focal measurement time period; and determining said set of major measurements by averaging said first portion of the plurality of input data sets. Second processing may be performed if the back-end write status is unsustainable. The second processing may include selecting a first portion of the plurality of input data sets, said first portion including a first of the plurality of input data sets corresponding to the focal minor measurement time period and one or more of the plurality of inputs data sets corresponding to minor measurement time periods included in the post-range portion, wherein the first portion also conditionally includes one or more of the plurality of input data sets corresponding to minor measurement time periods in the pre-range portion if the average write data transfer rate, and the average write throughput for each of the one or more input data sets corresponding to a minor measurement time period of the post-range portion are more than corresponding values in the one input data set corresponding to the focal measurement time period; and determining said set of major measurements by averaging said first portion of the plurality of input data sets. Front-end limit tracking may be performed for data transfer rate and I/O throughput for front-end components of the second data storage system used in connection with servicing read and write I/O operations directed to the set of one or more logical devices having storage provisioned on the second data storage system, said front-end limit tracking modeling upper bounds for the front-end components in terms of maximum data transfer rate and maximum I/O throughput, and wherein back-end limit tracking is performed for data transfer rate and I/O throughput for back-end components of the second data storage system used in connection with servicing read and write I/O operations directed to the set of one or more logical devices having storage provisioned on the second data storage system, said back-end limit tracking modeling upper bounds for the back-end components in terms of maximum data transfer rate and maximum I/O throughput. The plurality of inputs data sets may be processed by the front-end limit tracking and tracks a highest data transfer rate without overload, a lowest data transfer rate with overload, a highest I/O throughput without overload and a lowest I/O throughput with overload, and wherein strong prediction ranges are associated with I/O throughput values larger than the lowest I/O throughput with overload or smaller than the highest I/O throughput without overload, and wherein strong prediction ranges are associated with data transfer rates larger than the lowest data transfer rate with overload or smaller than the highest data transfer rate without overload. For a given workload directed to the set of one or more logical devices having storage provisioned on the set of one or more physical devices of the second data storage system, modeling may use limits tracked by the front-end limit tracking to predict one or more values including a front-end component utilization level. The set of one or more physical devices may be any one of a plurality of different candidate configurations having a unique combination of drive technology and RAID level. The back-end limit tracking may be performed for each of the plurality of different candidate configurations and wherein a plurality of sets of major measurements for a plurality of major measurement time periods may be processed in connection with the back-end limit tracking whereby the back-end limit tracking tracks, for each of the plurality of different candidate configurations, a highest data transfer rate without overload, a lowest data transfer rate with overload, a highest I/O throughput without overload and a lowest I/O throughput with overload. Strong prediction ranges may be associated with I/O throughput values larger than the lowest I/O throughput with overload or smaller than the highest I/O throughput without overload, and wherein strong prediction ranges may be associated with data transfer rates larger than the lowest data transfer rate with overload or smaller than the highest data transfer rate without overload. For a given workload directed to the set of one or more logical devices having storage provisioned on the set of one or more physical devices of the second data storage system, modeling may use limits tracked by the back-end limit tracking to predict, for each of the plurality of different candidate configurations, a back-end component utilization level, a response time denoting a portion of total response time due to the back-end components processing the given workload, indication of overload or no overload status, and associated confidence level of strong or weak regarding the indication of overload or no overload. Fault tracking may be performed for overload predictions made with respect to limits tracked for each of the plurality of different candidate configurations. Modeling may predict that the set of one or more physical devices has a RAID level associated with a first of the plurality of different candidate configurations having a least number of faults. The set of one or more physical devices may be one of a plurality of candidate drive technologies and a score may be maintained by modeling for each of the candidate drive technologies as additional information regarding different workloads are observed in connection with performing I/O operations to the set of one or more logical devices over a period of time. Modeling may determined the score for each of the candidate drive technologies in accordance with criteria including response time. Modeling may generate a predicted drive technology selection and an associated confidence measure whereby the predicted drive technology selection may be a prediction regarding a drive technology of the set of one or more physical devices based on which of the plurality of candidate drive technologies has a highest score relative to others of the plurality of candidate drive technologies.

In accordance with another aspect of the invention is a computer readable medium comprising code stored thereon for data storage system modeling, the computer readable medium comprising code for: receiving, at a first data storage system, information representing a workload for performing I/O operations directed to a set of one or more logical devices having storage provisioned on a set of one or more physical devices of a second data storage system, wherein at least some of the information representing the workload is obtained by performing discovery processing to discover performance characteristics of the set of one or more physical devices, said discovery processing including: receiving, at the first data storage system, a plurality of I/O operations from a client directed to the set of one or more logical devices having storage provisioned on the set of physical devices of the second data storage system; issuing, by the first data storage system to the second data storage system, the plurality of I/O operations; and obtaining, at the first data storage system in response to said issuing, a set of performance data representing the workload for the plurality of I/O operations directed to the set of logical devices having storage provisioned on the set of one or more physical devices of the second data storage system; and modeling performance of the second data storage system in accordance with the workload.

In accordance with another aspect of the invention is a system comprising: a host; a first data storage system; and a second data storage system having storage accessed from the first data storage system. The first data storage system includes a computer readable medium comprising code stored thereon for: receiving, at the first data storage system, information representing a workload for performing I/O operations directed to a set of one or more logical devices having storage provisioned on a set of one or more physical devices of the second data storage system, wherein at least some of the information representing the workload is obtained by performing discovery processing to discover performance characteristics of the set of one or more physical devices, said discovery processing including: receiving, at the first data storage system, a plurality of I/O operations from the host directed to the set of one or more logical devices having storage provisioned on the set of physical devices of the second data storage system; issuing, by the first data storage system to the second data storage system, the plurality of I/O operations; and obtaining, at the first data storage system in response to said issuing, a set of performance data representing the workload for the plurality of I/O operations directed to the set of logical devices having storage provisioned on the set of one or more physical devices of the second data storage system; and modeling performance of the second data storage system in accordance with the workload, wherein the plurality of I/O operations includes non-exploratory I/O operations from the host, said non-exploratory I/O operations including at least some write operations and at least some read operations.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
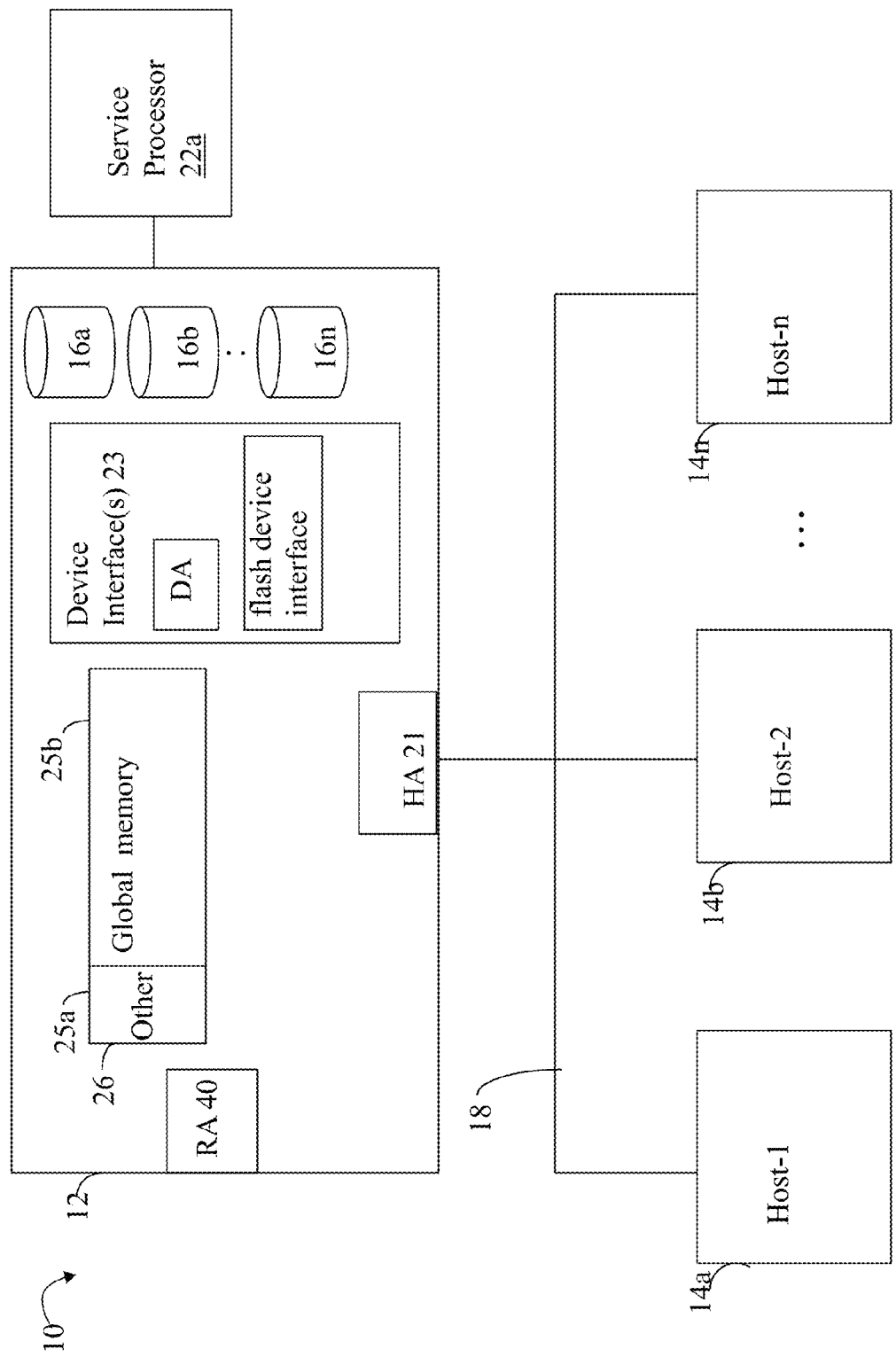
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel of other front-end adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which are sometimes also referred to as logical units (e.g., LUNs). The LVs may or may not correspond to the actual physical devices or drives 16a-16n. For example, one or more LVs may reside on a single physical drive or multiple drives. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LV(s) residing thereon. A flash device interface may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA, performs I/O operations on a drive 16a-16n. In the following description, data residing on an LV may be accessed by the device interface following a data request in connection with I/O operations that other directors originate. Data may be accessed by LV in which a single device interface manages data requests in connection with the different one or more LVs that may reside on a drive 16a-16n. For example, a device interface may be a DA that accomplishes the foregoing by creating job records for the different LVs associated with a particular device. These different job records may be associated with the different LVs in a data structure stored and managed by each device interface.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area. Additional detail regarding the service processor 22a is described in following paragraphs.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

Figure 2:
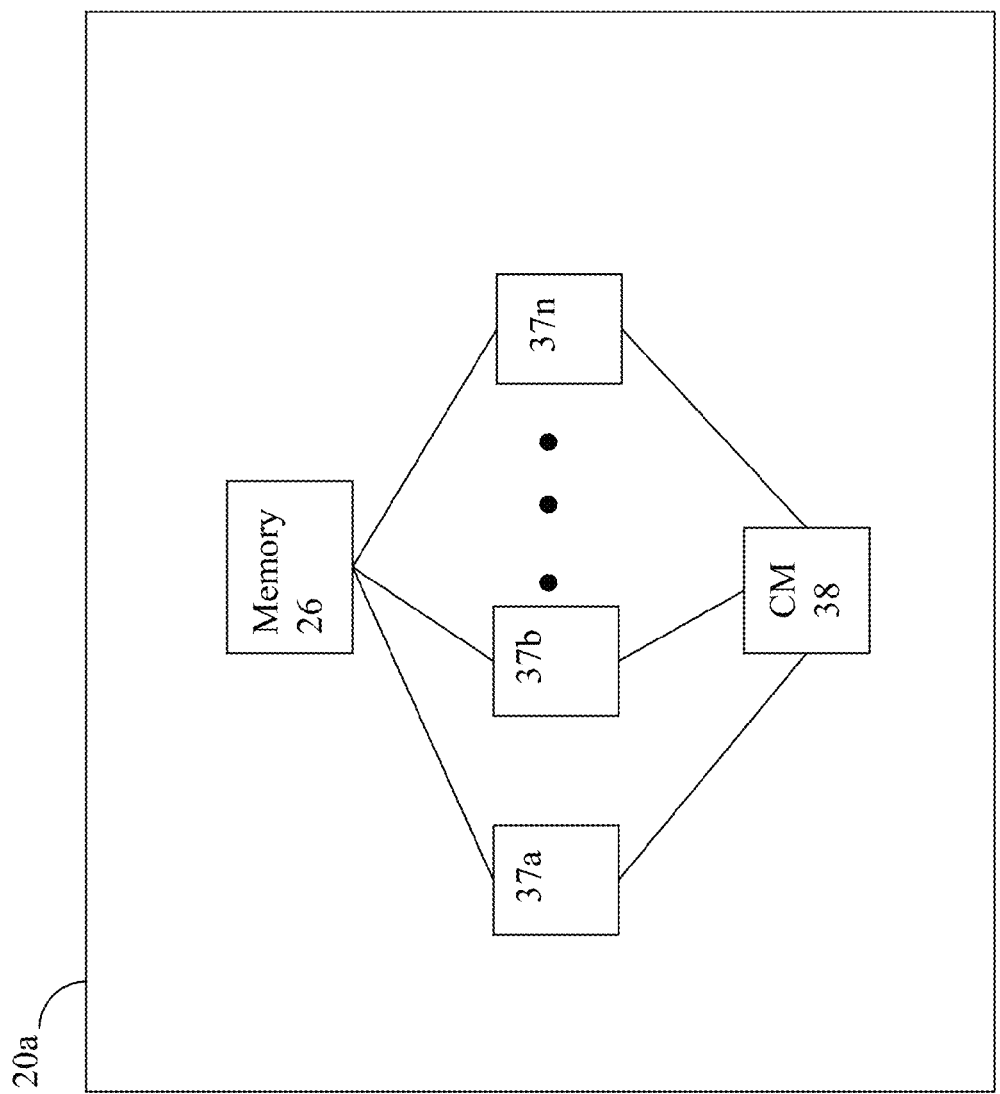
FIG. 2 is a representation of the logical internal communications between the directors and memory included in one embodiment of a data storage system of FIG. 1.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. For example, in connection with a write operation, an embodiment may first store the data in cache included in a portion of GM 25b, mark the cache slot including the write operation data as write pending (WP), and then later de-stage the WP data from cache to one of the devices 16a-16n. In this manner, a write operation may be deemed sufficiently complete to return an acknowledge to the host after the write data has been stored in cache rather than wait until the data has been actually destaged and written to the physical device such as disk drive or flash drive. Alternatively, depending on the embodiment, an acknowledgement may be returned to the host that the write operation is complete after other processing has been completed on the data storage system (e.g., may return acknowledgement after the data has been destaged in embodiments using write back caching, may return acknowledgement after data has been copied to a remote data storage system, and the like). In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a Symmetrix® DMX™ or VMAX™ data storage array by EMC Corporation of Hopkinton, Mass. In the foregoing data storage array, the data storage devices 16a-16n may include a combination of disk devices and flash devices in which the flash devices may appear as standard Fibre Channel (FC) drives to the various software tools used in connection with the data storage array. The flash devices may be constructed using nonvolatile semiconductor NAND flash memory. The flash devices may include one or more SLC (single level cell) devices and/or MLC (multi level cell) devices.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed. Thus, a flash device may be expected to have a usage measured in calendar or wall clock elapsed time based on the amount of time it takes to perform the number of guaranteed write cycles. The techniques herein may also be used with other flash devices, more generally referred to as non-enterprise class flash devices, which, when performing writes at a same rate as for enterprise class drives, may have a lower expected lifetime based on a lower number of guaranteed write cycles.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration.

An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD drive (such as a flash drive), a particular type of SSD drive (such using flash or a form of RAM), a type of magnetic disk or other non-SSD drive (such as an FC disk drive, a SATA (Serial Advanced Technology Attachment) drive), and the like. Data protection may specify a type or level of data storage protection such, for example, as a particular RAID level (e.g., RAID1, RAID-5 3+1, RAID5 7+1, and the like). Performance characteristics may relate to different performance aspects of the physical storage devices of a particular type or technology. For example, there may be multiple types of FC disk drives based on the RPM characteristics of the FC disk drives (e.g., 10K RPM FC drives and 15K RPM FC drives) and FC disk drives having different RPM characteristics may be included in different storage tiers. Storage capacity may specify the amount of data, such as in bytes, that may be stored on the drives. An embodiment may allow a user to define one or more such storage tiers. For example, an embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all FC drives, and a third tier of all SATA drives. The foregoing are some examples of tier definitions and other tier definitions may be specified in accordance with techniques herein.

Figure 3:
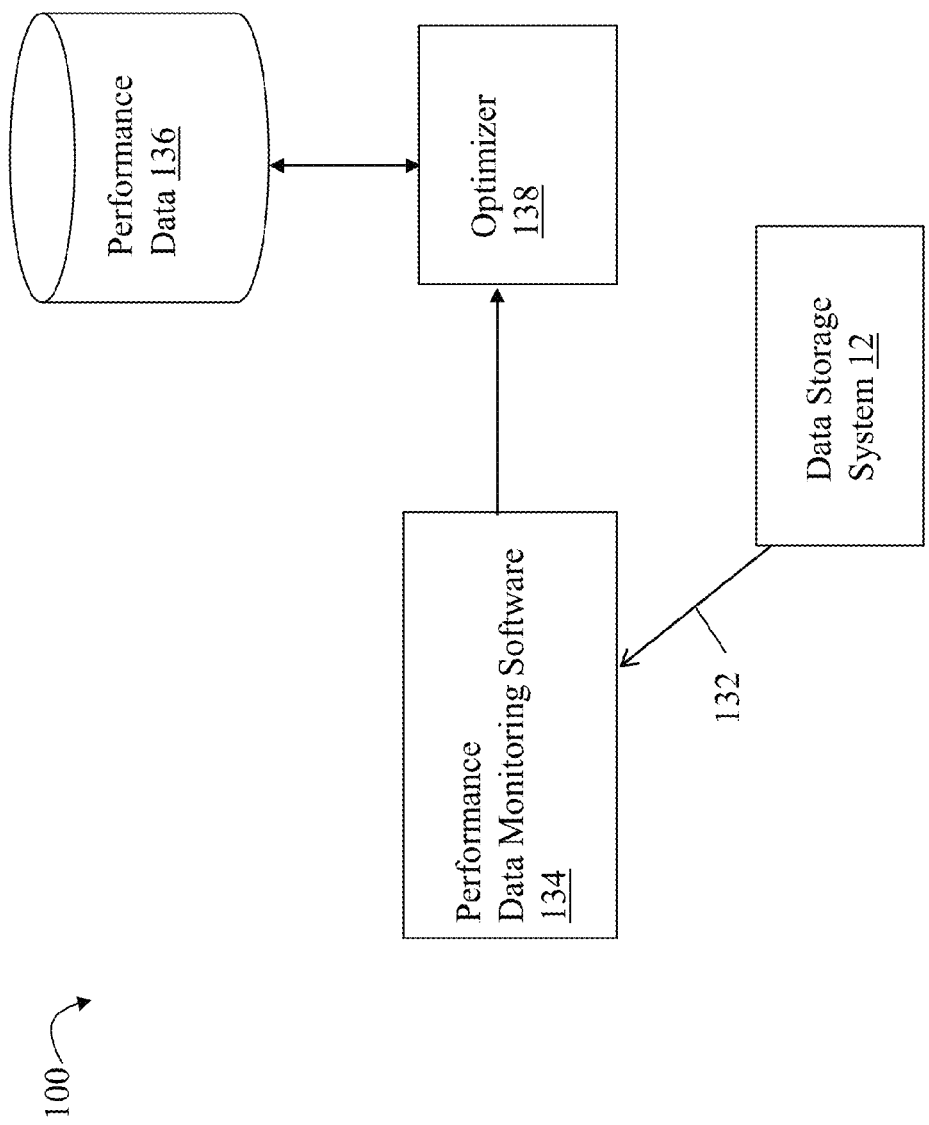
FIG. 3 is an example representing components that may be included in a service processor in an embodiment in accordance with techniques herein.

Referring to FIG. 3, shown is an example 100 of software that may be included in a service processor such as 22a. It should be noted that the service processor may be any one of a variety of commercially available processors, such as an Intel-based processor, and the like. Although what is described herein shows details of software that may reside in the service processor 22a, all or portions of the illustrated components may also reside elsewhere such as, for example, on any of the host systems 14a 14n.

Included in the service processor 22a is performance data monitoring software 134 which gathers performance data about the data storage system 12 through the connection 132. The performance data monitoring software 134 gathers and stores performance data and forwards this to the optimizer 138 which further stores the data in the performance data file 136. This performance data 136 may also serve as an input to the optimizer 138 which attempts to enhance the performance of I/O operations, such as those I/O operations associated with data storage devices 16a-16n of the system 12. The optimizer 138 may take into consideration various types of parameters and performance data 136 in an attempt to optimize particular metrics associated with performance of the data storage system 12. The performance data 136 may be used by the optimizer to determine metrics described and used in connection with techniques herein. The optimizer may access the performance data, for example, collected for a plurality of LVs when performing a data storage optimization. The performance data 136 may be used in determining a workload for one or more physical devices, logical devices or volumes (LVs) serving as data devices, thin or virtually provisioned devices, portions of devices, and the like. The workload may also be a measurement or level of "how busy" a device is, for example, in terms of I/O operations (e.g., I/O throughput such as number of I/Os/second (IOPS), response time (RT), and the like).

The response time for a storage device or volume may be based on a response time associated with the a physical storage device, LV, or other data portion or entity to which I/Os are directed, for a period of time. The response time may based on read and write operations directed to the storage device or volume. Response time represents the amount of time it takes the storage system to complete an I/O request (e.g., a read or write request). Response time may be characterized as including two components: service time and wait time. Service time is the actual amount of time spent servicing or completing an I/O request after receiving the request from a host via an HA 21, or after the storage system 12 generates the I/O request internally. The wait time is the amount of time the I/O request spends waiting in line or queue waiting for service (e.g., prior to executing the I/O operation).

It should be noted that the operations of read and write with respect to an LV having its data stored on one or more physical devices may be viewed as "back end" read and write requests or commands from the DA 23, controller or other backend physical device interface. Thus, these are operations may also be characterized as a number of operations with respect to the physical storage device (e.g., number of physical device reads, writes, and the like, based on physical device accesses). This is in contrast to observing or counting a number of particular types of I/O requests (e.g., "front end" reads or writes) as issued from the host and received by a front end component such as an HA 21. To illustrate, a host read request (also characterized as a front end I/O request) may not result in a read request or command issued to the DA if there is a cache hit and the requested data is in cache. The host read request results in a read request or command issued to the DA 23 to retrieve data from the physical drive only if there is a read miss. Furthermore, when writing data of a received host I/O request to the physical device, the host write request may result in multiple "back end" reads and/or writes by the DA 23 in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes, may refer to the read and write requests or commands performed by the DA (e.g., backend request or I/Os). Such read and write commands may correspond, respectively, to physical device accesses such as disk reads and writes that may result from a host I/O request received by an HA 21.

Consistent with the above, workload data such as related to incoming I/Os may be characterized in terms of a front end data storage system perspective and also from a back end data storage system perspective. From the front end perspective, a workload may be expressed in terms of I/Os per second (IOPS), read operations/second, write operations/second, and the like, based on I/Os as received by the front end and host perspective. The front end workload generally may be mapped or translated into back end workload such as described above where a single front end or host I/O may result in a different number and/or type of back end I/Os (e.g., based on RAID level of the physical storage for an LV to which the single front end or host I/O is directed). The optimizer may perform evaluations, such as in connection with data movement optimizations described elsewhere herein, using workload and performance information expressed in terms of back end I/Os.

The optimizer 138 may perform processing to determine how to allocate or partition physical storage in a multi-tiered environment for use by multiple applications. The optimizer 138 may also perform other processing such as, for example, to determine what particular portions of devices to store on physical devices of a particular tier, evaluate when to migrate or move data between physical drives of different tiers, and the like. It should be noted that the optimizer 138 may generally represent one or more components that perform processing as described herein as well as one or more other optimizations and other processing that may be performed in an embodiment.

The data storage optimizer may automatically place particular data portions in different storage tiers where it has determined such placement or movement will improve data storage system performance. The data portions may be automatically relocated or migrated to a different storage tier as the work load and observed performance characteristics for the data portions change over time. In accordance with techniques herein, analysis of performance data for data portions of thin devices may be performed in order to determine whether particular data portions should have their data contents stored on physical devices located in a particular storage tier. The techniques herein may take into account how "busy" the data portions are (e.g., such as I/O throughput or I/Os per unit of time, response time, utilization, and the like) in combination with storage tier capacities in order to evaluate which data to store on drives of the storage tiers.

Promotion may refer to movement of data from a first storage tier to a second storage tier where the second storage tier is characterized as having devices of higher performance than devices of the first storage tier. Demotion may refer generally to movement of data from a first storage tier to a second storage tier where the first storage tier is characterized as having devices of higher performance than devices of the second storage tier. As such, movement of data from a first tier of flash devices to a second tier of FC devices and/or SATA devices may be characterized as a demotion and movement of data from the foregoing second tier to the first tier a promotion. The promotion and demotion thresholds refer to thresholds used in connection with data movement.

As an example, the techniques herein may be described with reference to a storage environment having three storage tiers—a first tier of only flash drives in the data storage system, a second tier of only FC disk drives, and a third tier of only SATA disk drives. In terms of performance, the foregoing three tiers may be ranked from highest to lowest as follows: first, second, and then third. The lower the tier ranking, the lower the tier's performance characteristics (e.g., longer latency times, capable of less I/O throughput/second/GB (or other storage unit), and the like). Generally, different types of physical devices or physical drives have different types of characteristics. There are different reasons why one may want to use one storage tier and type of drive over another depending on criteria, goals and the current performance characteristics exhibited in connection with performing I/O operations. For example, flash drives of the first tier may be a best choice or candidate for storing data which may be characterized as I/O intensive or "busy" thereby experiencing a high rate of I/Os to frequently access the physical storage device containing the LV's data. However, flash drives tend to be expensive in terms of storage capacity. SATA drives may be a best choice or candidate for storing data of devices requiring a large storage capacity and which are not I/O intensive with respect to access and retrieval from the physical storage device. The second tier of FC disk drives may be characterized as "in between" flash drives and SATA drives in terms of cost/GB and I/O performance. Thus, in terms of relative performance characteristics, flash drives may be characterized as having higher performance than both FC and SATA disks, and FC disks may be characterized as having a higher performance than SATA.

Since flash drives of the first tier are the best suited for high throughput/sec/GB, processing may be performed to determine which of the devices, and portions thereof, are characterized as most I/O intensive and therefore may be good candidates to have their data stored on flash drives. Similarly, the second most I/O intensive devices, and portions thereof, may be good candidates to store on FC disk drives of the second tier and the least I/O intensive devices may be good candidates to store on SATA drives of the third tier. As such, workload for an application may be determined using some measure of I/O intensity, performance or activity (e.g., I/O throughput/second, percentage of read operation, percentage of write operations, response time, etc.) of each device used for the application's data. Some measure of workload may be used as a factor or criterion in combination with possibly others for determining what data portions are located on the physical storage devices of each of the different storage tiers.

Figure 4:
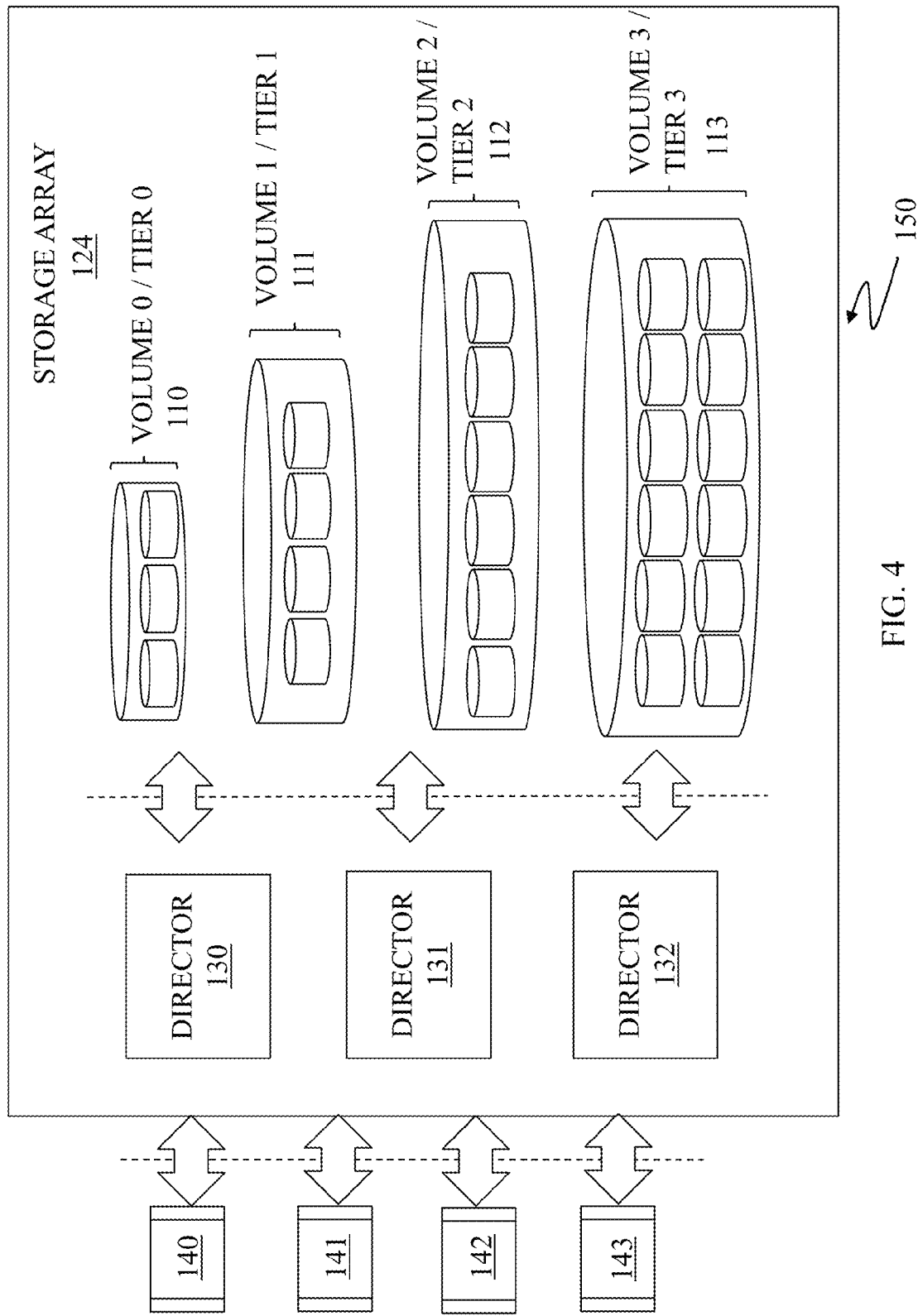
FIG. 4 is an example illustrating a data storage system, such as data storage array, including a plurality of storage tiers in an embodiment in accordance with techniques herein.

FIG. 4 is a schematic illustration showing a storage system 150 that may be used in connection with an embodiment of the system described herein. The storage system 150 may include a storage array 124 having multiple directors 130-132 and multiple storage volumes (LVs, logical devices or VOLUMES 0-3) 110-113. Host applications 140-144 and/or other entities (e.g., other storage devices, SAN switches, etc.) request data writes and data reads to and from the storage array 124 that are facilitated using one or more of the directors 130-132. The storage array 124 may include similar features as that discussed above.

The volumes 110-113 may be provided in multiple storage tiers (TIERS 0-3) that may have different storage characteristics, such as speed, cost, reliability, availability, security and/or other characteristics. As described above, a tier may represent a set of storage resources, such as physical storage devices, residing in a storage platform. Examples of storage disks that may be used as storage resources within a storage array of a tier may include sets SATA disks, FC disks and/or EFDs, among other known types of storage devices.

According to various embodiments, each of the volumes 110-113 may be located in different storage tiers. Tiered storage provides that data may be initially allocated to a particular fast volume/tier, but a portion of the data that has not been used over a period of time (for example, three weeks) may be automatically moved to a slower (and perhaps less expensive) tier. For example, data that is expected to be used frequently, for example database indices, may be initially written directly to fast storage whereas data that is not expected to be accessed frequently, for example backup or archived data, may be initially written to slower storage. In an embodiment, the system described herein may be used in connection with a Fully Automated Storage Tiering (FAST) product produced by EMC Corporation of Hopkinton, Mass., that provides for the optimization of the use of different storage tiers including the ability to easily create and apply tiering policies (e.g., allocation policies, data movement policies including promotion and demotion thresholds, and the like) to transparently automate the control, placement, and movement of data within a storage system based on business needs. Various aspects of data storage optimization are described, for example, in U.S. patent application Ser. No. 13/466,775, filed May 8, 2012, PERFORMING DATA STORAGE OPTIMIZATIONS ACROSS MULTIPLE DATA STORAGE SYSTEMS, which is incorporated by reference herein.

Described above are different techniques that may be performed by an optimizer, for example, such as the optimizer 138 with reference back to FIG. 3. As described herein the optimizer may perform processing of the techniques herein to determine how to allocate or partition physical storage in a multi-tiered environment for use by multiple applications. The optimizer may perform processing such as, for example, to determine what particular portions of LVs to store on physical devices of a particular tier, evaluate when to migrate or move data between physical drives of different tiers, and the like. In connection with above-mentioned descriptions, embodiments are described whereby the optimizer may be included as a component of the data storage system, such as a data storage array. In such embodiments, the optimizer may perform optimizations, such as the data movement optimization, with respect to physical devices of a single data storage system such as a single data storage array. Such data movement optimizations may be performed with respect to different data storage units of granularity that may be vary with embodiment and/or type of logical devices. For example, an embodiment may provide for partitioning data of a logical device (as may be stored on one or more physical devices (PDs)) into multiple data portions of any suitable size. The data movement optimization processing may provide for evaluation and data movement of individual data portions (each of which can be much less than the size of entire LV) between storage tiers based on the workload or activity of I/Os directed to each such data portion. As the workload may change dynamically over time, the data storage optimizer may continuously evaluate and perform data movement optimizations as needed responsive to such changing workloads.

The data storage optimizer may be located in a first or primary data storage system and may perform data storage optimizations, such as data movement and other optimizations, for PDS stored on the first data storage system. Additionally, the optimizer, or more generally, the one or more components performing the optimization processing, may perform data storage optimizations with respect to externally located data storage systems and PDs. For example, the first data storage system may be connected, directly or through a network or other connection, to a one or more external data storage systems. The optimizer of the first data storage system may perform data storage optimizations such as data movement optimizations with respect to PDs of the first data storage system and also other PDs of the one or more other external data storage systems. In this manner, the data storage optimizer may perform data storage optimizations of its own local devices and/or other devices physically located in another component other than the data storage system. In other words, the techniques herein for performing data movement evaluation, performing the actual movement of data such as between physical devices of different storage tiers, and the like, may be performed by code executing on a component that is external with respect to the data storage system including the physical devices for which such data movement optimization is performed.

Figure 5:
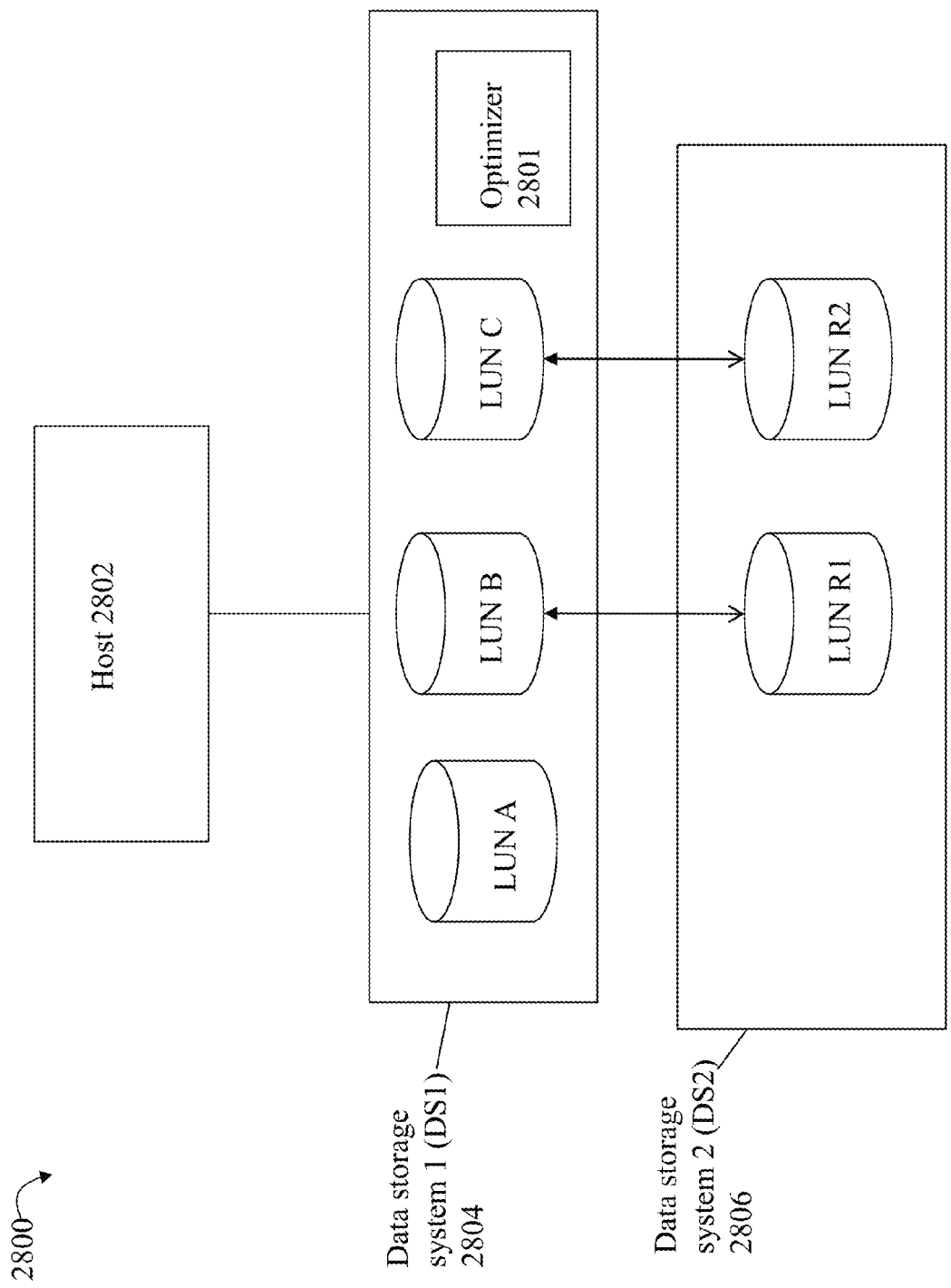
FIGS. 5 and 6 are examples of a host issuing I/Os to a primary data storage system which also performs data optimizations and stores data on external data storage system(s)

For example, with reference now to FIG. 5, shown is an example 2800 of a system and network including a host 2802, data storage system 1 (DS1) 2804 and data storage system 2 (DS2) 2806. The data storage optimizer 2801 as may be included in DS1 2804 may perform data storage optimizations across multiple storage tiers of PDs included in DS1 2804 and also PDs of DS2 2806. The optimizer 2801 may perform optimization processing such as in connection with data movement evaluation for moving data portions of LUNs between different underlying PDs providing the physical storage for the LUNs. DS1 2806 may provide for presenting to the host 2802 storage on both DS1 and DS2. LUNs A, B and C may be presented as devices of DS1 where LUN A may have underlying storage provisioned on PDs of DS1 and LUNs B and C may have underlying storage provisioned on PDs of DS2. For example, as illustrated, DS1 may map LUNs B and C (presented to the host as devices of DS1) to LUNs R1 and R2, respectively, of DS 2.

DS1 may utilize one or more components providing a "virtualized backend" to DS2 such as, for example, where a DA of DS1 communicates with an FA of DS2 to access LUNs R1 and R2 of DS2. In connection with SCSI terminology, a port of a DA of DS1 may be an initiator and a port of an FA of DS2 may be a target forming a path over which DS1 may access a LUN of DS2 (e.g., access one of the LUNs R1, R2). Thus, the example 1000 is an illustration whereby the host 1002 communicates directly with DS1 1004 issuing commands and operations to LUNs A-C. Host 2802 is provided access to storage and devices of DS2 only indirectly through DS1. As such, DS1 may want to know different types of information about DS 2 2806 (e.g., such as regarding the underlying PD storage from which LUNs R1 and R2 of DS2 are provisioned in connection with providing data services, and other information as described elsewhere herein) in connection with performing data storage optimizations. Information regarding DS2, such as related to the configuration of DS2, the performance or storage tier classification for PDs providing storage for LUNs R1 and R2 of DS2, and the like, may not be available to DS1. Since such information is not provided to DS1, an embodiment may utilize the techniques herein to discover such information regarding DS2 and the PDs of DS 2 providing storage for the LUNs of DS2. The techniques herein may be performed by executing code on DS1 to determine such information including performance classifications or storage tiers of underlying PDs providing storage for LUNs R1 and R2. The foregoing information may be used as described elsewhere herein in connection with optimizations whereby an optimizer of DS1 does data movement and placement of LUN data of LUNs A-C. For example, DS1 may control movement and placement of data for LUNs B and C on selected ones of LUNs R1, R2 of DS2 based on particular storage tier classifications of PD groups for LUNs R1 and R2. For example, LUN R1 of DS2 may be classified as having its data stored on a first group of PDs which are EFDs and LUN R2 may be classified as having its data stored on a second group of PDs which are rotating FC disk drives. At a first point in time, DS1 may store data of LUN B which is frequently accessed by the host on LUN R1 and may store data of LUN C which is much less frequently accessed by the host on LUN R2 as illustrated in the example 2800. At a second point in time, the optimizer may determine that the data of LUN B is now much less frequently accessed than the data of LUN C and may relocate or move data of LUN B to LUN R2 and may move data of LUN C to LUN R1. Thus, DS1 may address each LUN of DS2 in a manner similar to one of its own PDs for placement and data movement optimizations.

It should be noted that the foregoing example describes performing data storage optimizations, such as data movement and placement, with reference to an entire LUN. However, as described elsewhere herein and also appreciated by those skilled in the art, such data movement and placement may be performed with respect to varying and different levels of storage granularity rather than per LUN. For example, the foregoing may be used in connection with data movement and placement for a portion of a LUN such as LUN B whereby a first very active portion of LUN B may have its data stored on LUN R1 and a second much less active portion of LUN B may have its data stored on LUN R2 and yet a third portion of LUN B may have its data stored on PDs of DS1. DS1 may then perform processing to appropriately and suitably move such data portions as workload and activity for each such portion may change over time.

Figure 6:
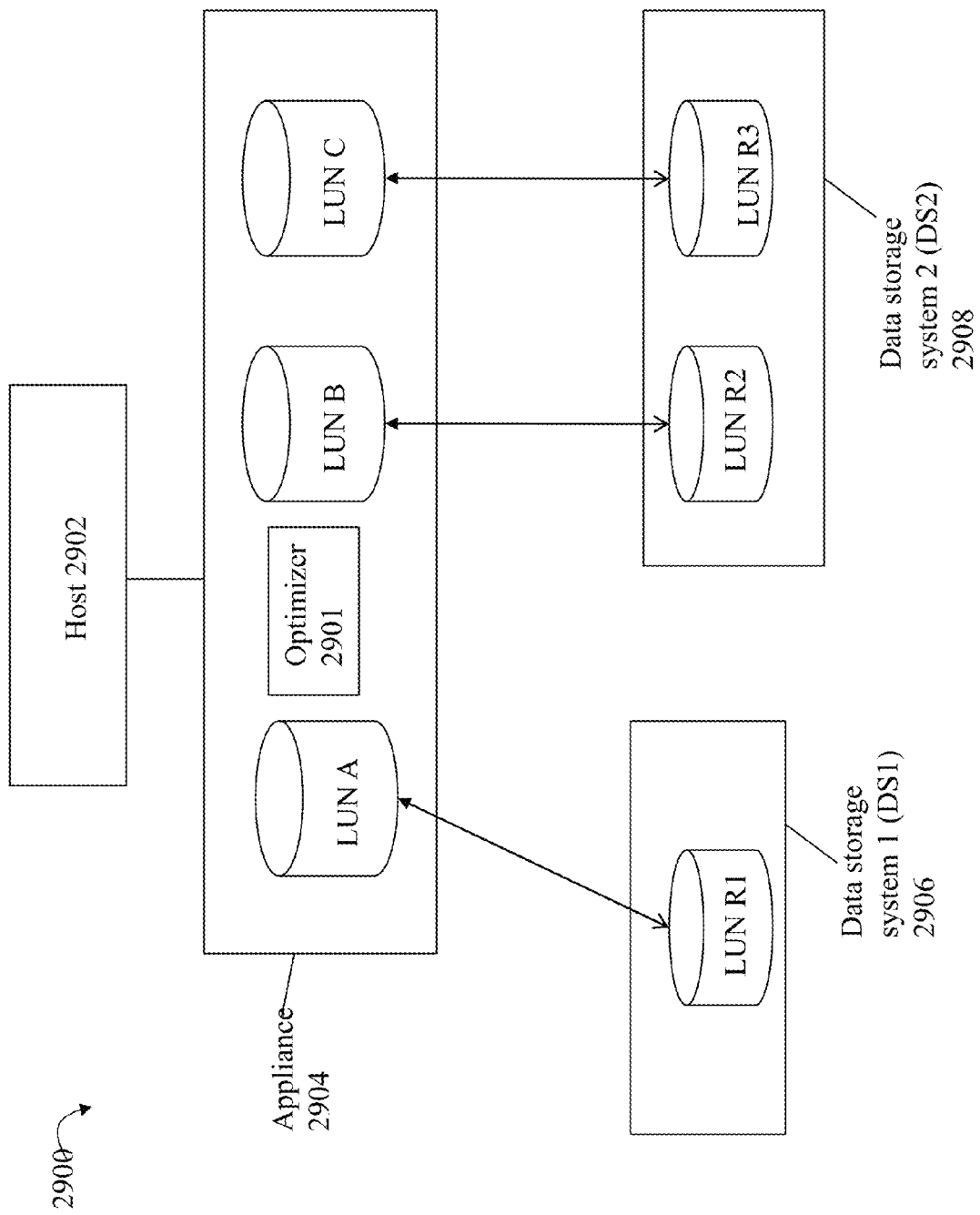

With reference now to FIG. 6, shown is another example of another embodiment that may utilize the techniques herein. The example 2900 includes a host 2902, appliance 2904 and DS1 2906 and DS2 2908. The appliance 2904 may be a data storage virtualization appliance such as an EMU® VPLEX™ appliance which accesses and aggregates storage from multiple data storage systems DS1 and DS2 whereby each such data storage system may be of the same or different types (e.g., same or different manufacturers as well as different array types that may be from a same manufacturer). In this manner, the appliance 2904 may present storage of DS1 and DS2 in an aggregated virtualized environment to the host 2902 and other clients. The host 2902 communicates with the appliance 2904 to access data on any one of the virtualized storage devices LUNs A-C exposed to the client and each such virtualized storage device of the appliance may be mapped to one or more other LUNs R1-R3 of one or more other data storage systems such as DS1 2906 and DS2 2908. To illustrate, the appliance 2904 may expose or present to the host LUNs A-C. As such, the appliance 2904 may want to know information about DS1 2906, DS2 2908 and the underlying PD storage from which LUNs R1, R2, and R3 are provisioned in connection with providing data services, performing optimizations such as data movement as described elsewhere herein, and the like. Such information regarding the configuration and performance classification of LUNs R1, R2 and R3 may not be available to the appliance 2904 (e.g. the appliance may not be provided with information regarding the storage tier classification of the underlying PDs from which storage is configured for storing data of LUNs R1, R2, and R3). Since such information is not provided to the appliance, an embodiment may utilize the techniques herein to discover such information regarding the DSs 2906, 2908 and the PDs provisioned for LUNs R1-R3 of DS1 and DS2. The techniques herein may be performed by executing code on the appliance to determine information such as storage classifications of underlying PDs providing storage for LUNs R1, R2 and R3. The foregoing information may be used as described elsewhere herein in connection with optimizations whereby an optimizer of the appliance may perform data movement of LUN data of LUNs A-C. For example, the appliance may at a first point in time map LUN A, or a portion thereof, to LUN R1 of DS1 determined to have its data stored on PDs of the EFD storage tier. Such mapping may be performed when the host is frequently accessing LUN A's data (e.g., when LUN A, or portion thereof, has a high workload and the optimizer determines to place such a highly active portion of data on the highest EFD storage tier). At a later point in time, assume the workload to LUN A, or the portion thereof, mapped to the LUN R1 of DS1 greatly decreases. The appliance may now determine that LUN A, or the portion thereof, has its data relocated or moved from the EFD storage tier of LUN R1 to LUN R2 of DS2 (whereby LUN R2 is determined to be of a lower performing tier than EFD (e.g., LUN R2 may be classified as having underlying PDs which are FC or SATA rotational disk drives rather than EFD drives).

In connection with a data storage system, such as DS1 2084 of FIG. 5, or an appliance 2904 of FIG. 6, including the data storage optimizer, it is desirable for the data storage optimizer to have information about the external data storage system and its PDs. As described elsewhere herein in more detail, such information may include performance characteristics (e.g., throughput limits or upper bounds regarding data transfer and IOPs, and RT characteristics) of the external data storage systems PDs and configuration information regarding the external data storage system. In connection with description herein in some contexts, the PDs of the external data storage system may be referred to as virtual drives from the perspective of a first or primary data storage system (e.g., DS1 2084) including the data storage optimizer. More generally, a virtual drive is a unit of storage that a storage system (such as DS1 2084) can use to provide storage services to its clients, but which may be embodied as a unit of logical storage presented to the storage system, such as over a storage network, from a separate data storage system. The former storage system including the data optimizer may also be referred to as the primary data storage system and the latter may be referred to as the external data storage system. In contrast with internal drives of the primary storage system, the physical storage media resources underlying a virtual drive do not reside within the primary storage system. The primary storage system delivers storage accesses to the storage media underlying a virtual drive or volume using standard storage network protocols. Examples of such external storage embodied as virtual volumes or drives are described, for example, in connection with LUN R1, R2 of DS 2 2806 of FIG. 5 and LUNs R1, R2 and R3 of DSs 2906, 2908 of FIG. 6.

In connection with the data storage optimizer having knowledge regarding the performance characteristics of virtual drives, the optimizer on the primary storage system should be able to predict, for a given candidate workload on a given set of drives (whether internal or virtual with respect to the primary storage system), what the resulting utilization and response time will be. In this manner, the primary storage system may avoid drive overload missing RT goals. One challenge of the primary storage system related to automating the optimization of a storage configuration that includes virtual drives is the fact that the primary storage system may not have access to explicit, quantitative information needed for modeling the virtual drives and/or external data storage system such as, for example, configuration and performance capabilities of the underlying external storage hardware, information regarding the RAID type in use in the external storage system, the extent to which a given virtual drive may be competing for external storage system resources with other virtual drives or with other activity on the external storage system, and the like. This challenge exists because, in practice, many candidate external storage systems may not support mechanisms, such as APIs (application programming interfaces), that may be used for exporting the needed information to the primary storage system without requiring significant involvement by human storage administrators, or without requiring the configuration of new reporting infrastructure. In some instances, the invasiveness and cost of such storage administration overhead and of implementing such reporting infrastructure can negate the benefits of using virtual drives in the first place.

The use of exploratory I/O, depending on the type and amount of exploratory I/O permitted, may allow more accurate and rapid determination of performance characteristics of the virtual or externally located drives. The term 'exploratory I/O operation' refers to an I/O operation that is internally generated by a storage system specifically for the purpose of identifying performance characteristics of the targeted storage resource. However, exploratory I/O loads that are great enough to explore performance limits may be large enough to noticeably degrade the performance of the primary and external storage systems while the exploratory I/Os are being issued. Furthermore, the exploratory I/O workloads may need to be run periodically to capture changes in the external array performance characteristics (due to changes in the intensity of competing workloads on the external array, or to configuration changes). In addition, performing exploratory write I/Oss can only be done if there are amount of processing overhead in the primary and external storage system. Additionally, there are complications related to the performing exploratory write I/Os (e.g., such as overwriting existing data).

Described in following paragraphs are techniques that may be used in connection with building a model for predicting how virtual drives will perform with a given workload using a performance discovery technique that requires no input from human storage administrators, and no configuration or activity level information reporting capability on the part of the external storage system. An embodiment in accordance with techniques herein, the primary storage system dynamically creates and updates a model of the performance of virtual drives by observing the throughput and response time of storage access requests delivered by the primary storage system to the virtual drives. Furthermore, the performance model may be developed based solely on observations of the storage accesses to virtual drives that arise in the normal course of providing storage services to the primary storage system clients (e.g. without using 'exploratory I/O operations'). However, it should be noted that while use of exploratory I/Os is not required, some embodiments may use techniques herein in combination with other techniques which may use exploratory I/Os to provide information about the external data storage system and its virtual drives.

An embodiment may include a primary storage system that executes a performance model-building algorithm to maintain performance models for virtual drives (or for groups thereof). One important aspect is the ability of the algorithm to determine and predict the response time that indicates the onset of overload of a virtual drive. This may be accomplished by determining a best-fit drive technology based on a predefined set of drive technology profiles as described below. The ability to interpret a response time in the context of a particular drive technology context allows the model to recognize virtual drive overload earlier, with the result being that the primary storage system will tend to overload the virtual drives less often, and to a lesser degree.

The list of candidate drive technology profiles used by the primary storage system may or may not be configured on a per-installation basis, and may span the drive technologies that might be encountered on the external data storage system. In a given embodiment, the profiles may be defined narrowly, or in such a way as to group certain technologies together whose performance differences might be too difficult to resolve given model-building limitations in a given embodiment. For example, an embodiment may have separate profiles for a 10K RPM FC rotating disk drive and a 15K RPM FC rotating disk drive. Alternatively, an embodiment may define a single profile for a typical or average FC rotating disk drive thereby merging both of the foregoing into a single drive technology profile.

As described in more detail below, the performance model provides the primary storage system with measures of a virtual drive performance model (including an indication of whether a clear technology profile has emerged for the virtual drive) thereby enabling the primary storage system to determine how much confidence to assign to predictions made by the model, and to pace the introduction of load into a virtual drive when overload limits have not been approached yet. The performance model may maintain a set of effective or current throughput limits that reflect the most recent observations. Such limits may also be temporally smoothed to allow adjustment to changes in throughput limits without the introduction of excessive thrashing.

The techniques herein provide for model building of the external data storage system and its virtual drives without being provided with explicit configuration-specific information regarding the external storage system and its drives. In some embodiments, the model-building techniques may additionally use information about a virtual drive, or group or virtual drives, in combination with other information it acquires using non-exploratory I/Os that may facilitate the model building process. Such additional information may include, for example, information that specifies (or narrows the possibilities) for the RAID type or drive technology in use, a specification of which virtual drives compete for the same underlying external system's back-end resources, and information about the size of the external data storage system cache. Since the external data storage system may have a cache of its own, and since the model is focused on modeling sustainable performance, a strategy is described herein that may be used to avoid reporting measurements that reflect write rates that cannot be sustained and to avoid reporting read response times that are likely to include significant numbers of cache hits.

An embodiment in accordance with techniques herein may provide a data storage system model as may be used to model the external storage system whereby the model may provide predictions about RH (read hit) and/or RM (read miss) RT as a function of workload, and may provide estimates of utilization from an operation processing standpoint (e.g., front end and back end IOPS) and a data transfer processing standpoint (e.g. data transfer throughput limits). As known in the art and also described herein, utilization is a percentage of a certain resource or resources (e.g., front end and/or backend data storage system components) with 100% being the maximum possible or saturation level such as with respect to a maximum limit or upper bound with respect to IOPS and data transfer.

Generally, an embodiment in accordance with modeling techniques herein may or may not use explicitly supplied inputs from a human or via an API from the external DS regarding external data storage system configuration, performance information, and the like. An embodiment in accordance with techniques herein may minimize or eliminate human supplied inputs such as, for example, configuration information and performance data related to the external storage system. An embodiment in accordance with techniques herein may use non-exploratory I/Os received from a host or other client in the usual course of data processing for discovery processing. In this manner, the techniques herein use non-exploratory I/Os to gain insights regarding performance of the external data storage system and may use such techniques of non-exploratory I/Os optionally in combination with other techniques which may use exploratory I/Os with controlled experiment. An embodiment not using exploratory I/Os for modeling may rely on insights gained by observing changes in performance (e.g., RT, throughput, etc) due to performing a data movement and/or I/Os received from a host or other client. The I/Os received from the host or other client used with modeling techniques herein may not be generated based on a predetermined set of characteristics and may not be generated for the particular purpose of testing. Rather, such I/Os from the client may be characterized as regular I/Os as generated in the normal course of a client's work.

As a variation, the modeling techniques herein may also use exploratory I/Os although the techniques herein do not require such controlled experimental conditions. As described in more detail elsewhere herein, controlled experimentation may include testing in a controlled data storage system environment where the system purposefully generates I/Os (e.g., exploratory I/Os) having a predefined type or set of characteristics as a controlled low or light rate with the data storage system not being in use for any other activities other than testing.

To accurately calculate predicted response time and utilization for a given external storage system configuration for a given workload, information that may be used includes a external data storage system configuration information, external data storage system performance characterization information by component, knowledge of how the workload will map to various physical components in the external system for processing and additional information regarding the state of the external system. For example, information regarding the external data storage system configuration may include front end configuration information (e.g., mapping of external LUNs (LUNs having data storage on the external system) to front-end ports, mapping of external LUNs to front-end processors, detailed cache configuration information (e.g., including information about cache partitioning, size, prefetching policies, etc.), back end configuration information (e.g., mapping of external LUNs to PDs and back-end processors (e.g., DAs) of the external system, exact type and size of each PD of the external system, RAID type in use for each PD or set of PDs) and configuration information regarding advanced features in the external system (e.g., local and/or remote replication, data storage optimization such as data storage movement for automated tiering), de-duplication or compression, reduced power consumption modes). Information regarding the external system performance characterization by component may include IOP and data transfer limits for front end CPUs and ports, RT contribution due to front end CPUs and ports, IOP and data transfer limits for backend CPUs and ports, IOP and data transfer limits for backend CPUs, RT contribution by backend CPUs, a RT/utilization mode for each drive type or technology of the external system, information about performance of any special processing algorithms (e.g., pre-fetch, post-fetch, read-end-of-track, replication operating within external array, dynamic mapping algorithms, automated tiering, external storage, etc). Information about the external system state may include information about the state of the cache, pending write requests, and state and nature of replication relationships within the external system. Knowledge of how the workload in question will map to the various physical components of the external system may include information about the I/O path that will be traversed through which backend and front end components when servicing the workload I/Os.

To make an accurate prediction of RT and utilization for a given workload for a given configuration, the model may also use the following to obtain complete knowledge of the workload: estimate of total load on external system front end components, estimate of total load on external system back end components, and an estimate of amount of advanced functionality performed on the external data storage system. It may however, not be practical or feasible to discover sufficient detail regarding all such aspects of performance characterization, workload and configuration for the external data storage system. Thus, techniques herein may use a generalized and simplified data storage system model as may be used to model the external data storage system.

The techniques herein may use a generalized model that provides a simplified yet suitable model for discovery, separate tracking of IOP and data transfer limits, and a generic RT vs. workload model for drives. The model may be simplified by viewing components in the aggregate such as all front end components, all backend components other than PDs, groups of one or more PDs, and the like. The model may provide measures of confidences with each prediction of performance. Consumers of the model predictions may use such confidence measures to make decisions regarding how to use the predicted values output by the model. Furthermore, the model itself may use the confidence measure to refine the generalized model such as to determine the RAID type in use as described in following paragraphs. The techniques herein may use a major/minor measurement scheme to facilitate and reduce the overhead of maintaining observations of response time vs. workload and approximating an estimate of the backend write load.

Figure 7:
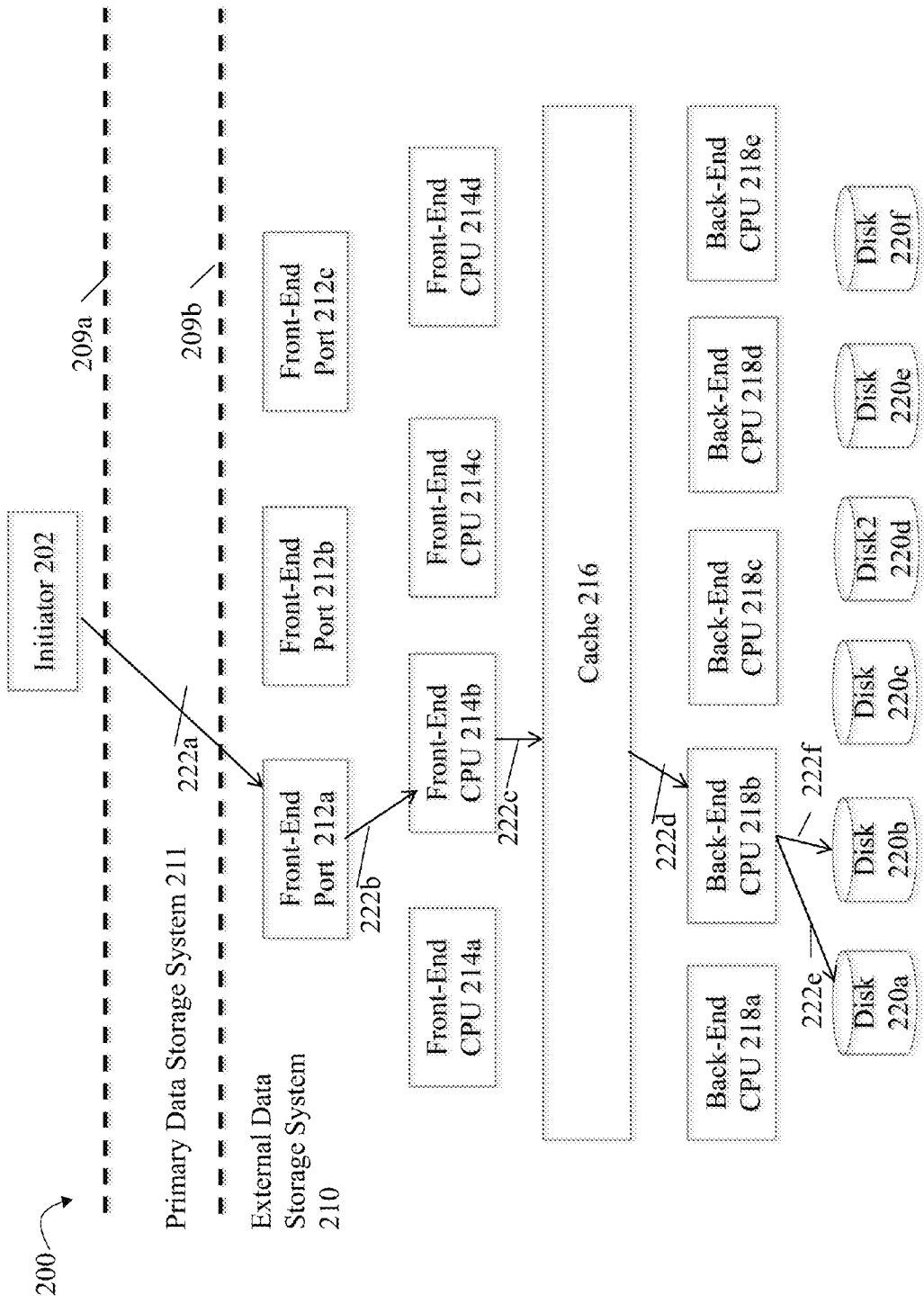
FIG. 7 is an example of a generalized data storage system configuration model that may be used in connection with techniques herein.

Referring to FIG. 7, shown is an example illustrating a generalized data storage system model as may be used in an embodiment in connection with techniques herein. The example 200 provides a generalized illustration of components that may assumed included in the external data storage system being modeled. It should be noted that an embodiment may include additional components or level of granularity than as illustrated in 200 depending on the particular data storage system, level of desired detail and/or availability of information for the model. The dashed lines 209a, 209b represent a partitioning of components whereby elements above dashed line 209a are included in the client such as a host, elements between dashed lines 209a and 209b are included in the primary data storage system 211, and elements below dashed line 209b are included in the external data storage system 210. The initiator 202 may be, for example, a host issuing an I/O request received by the primary data storage system 211 which is then forwarded to the external data storage system 210 through/by the primary system 211. The example 200 provides a general view of components of the external data storage system 210. It should be noted that element 202 represents the initiator which sends an I/O request directed to a LUN whereby the request is first received by the primary data storage system 211. System 211 then forwards the request to the external system 210 since the request is directed to the LUN having is data stored on PDs of the external system 210. The elements below the dashed line 209b illustrate those components of the model of the external system 210 and include front end (FE) ports 212a-c, FE CPUs 214a-d, cache 216, backend (BE) CPUs 218a-e, and disks (or more generally PDs) 220a-f. The initiator 202 may access an external LUN having its data storage on one or more of 220a-f and the path of components traversed in connection with servicing a particular LUN's I/O may include an FE port, a FE CPU, cache, a BE CPU, one or more PDs 220a-f.

Thus, the generalized external data storage configuration may include a FE configuration consistent with the above and FIG. 7 with a specified mapping of external LUNs to FE ports, mapping of external LUNs to FE CPUs, and a simplified cache configuration which may include a generalized estimate regarding a typical cache size and associated performance. The generalized external data storage configuration may include a BE configuration consistent with the above and FIG. 7 with a specified mapping of external LUNs to external PDs, a mapping of external LUNs to BE CPUs, a drive technology for each drive (e.g., there may be a generic model per technology such as for all FC disk drives, all SATA drives, all flash drives), and a RAID type in use for each PD 220a-f (or group of PDs).

The model may assume that there are no advanced features on the external data storage system such as noted above. In developing the generalized model, it is noted that data storage systems tend to be BE-performance limited rather than FE performance limited. In this manner, a simplified or generalized model such as illustrated in FIG. 7 and described herein may attach less priority to developing a detailed FE model and greater priority to developing a BE model. For example, the model as illustrated in FIG. 7 and described herein may include modeling BE aspects related to mapping of external LUNs to various components in connection with servicing I/O for the LUNs, drive technology and RAID type. The model as described herein may include a small number of performance models which are generic or generalized for different drive technologies.

In the example 200, arrows 222a-f illustrate the data flow of an I/O path through components where the I/O is issued from the initiator 202 of the primary storage system to a LUN of the external system 210 having its data stored on PDS 220a, b. The I/O may be transmitted to the FE port 212a (as illustrated by 222a), to FE CPU 214b (as illustrated by 222b), to cache 216 (as illustrated by 222c), to BE CPU 218b (as illustrated by 222d), to one of the PDs 220a or 220b (as illustrated respectively by 222e and 222f). The foregoing arrows illustrate an example of how the mappings may be exist between components of the external system and its external LUNs as exposed to the primary data storage system including initiator 202.

The external data storage system performance characterization may be generalized to include the following RT for read hits to external data storage system, IOPS and data transfer limits for external system FE CPUs and FE ports, RT (as function of back-end load) for read misses, IOPS and data transfer limits for external system BE CPUs, IOPS and data transfer limits for BE CPUs, IOPS and data transfer limits for PDs of external system, approximate read RT for PDs of external system as a function of workload on PDs.

The techniques herein may use data movement and host I/O activity of real or actual workloads to discover performance aspects of the external data storage system through observation of RT, IOPS throughput and data transfer throughput. Discovery processing may be continuously performed as the primary data storage system issues I/Os to the external system and responsive performance measurements are observed in a continuous manner over time. Thus the model may be continuously updated based on new observed measurements.

As described herein and with reference back to FIGS. 5 and 6, the discovery processing for discovering aspects of the modeled external system (such as DS2 2806 of FIG. 6) may use regular I/Os or real I/Os which are received at the primary system (such as 2904 of FIG. 6 or 2804 of FIG. 5) from a client (such as host 2802 of FIG. 5 or 2902 of FIG. 6) and are serviced by the primary and external systems. Thus, discovery processing uses these I/Os which are not generated in a controlled manner in accordance with a predetermined pattern or set of characteristics as may be the case in connection with a controlled discovery processing where the I/O are generated purposefully based on a predetermined set of characteristics desirable for testing purposes. However, techniques herein provide for processing observed performance metrics based on discovery performed with non-exploratory I/Os which may include any read and writes issued by the host. Techniques herein may use the major/minor measurement scheme described below to process the non-exploratory I/Os and provide inputs to the model such as regarding BE performance information/metrics. Thus, the model may be continuously updated as minor and major measurements described below in more detail become available.

What will now be described is the major/minor measurement technique that may be used in an embodiment in accordance with techniques herein to collect observed performance metrics that may serve as an input to the data storage system model.

Figure 8:
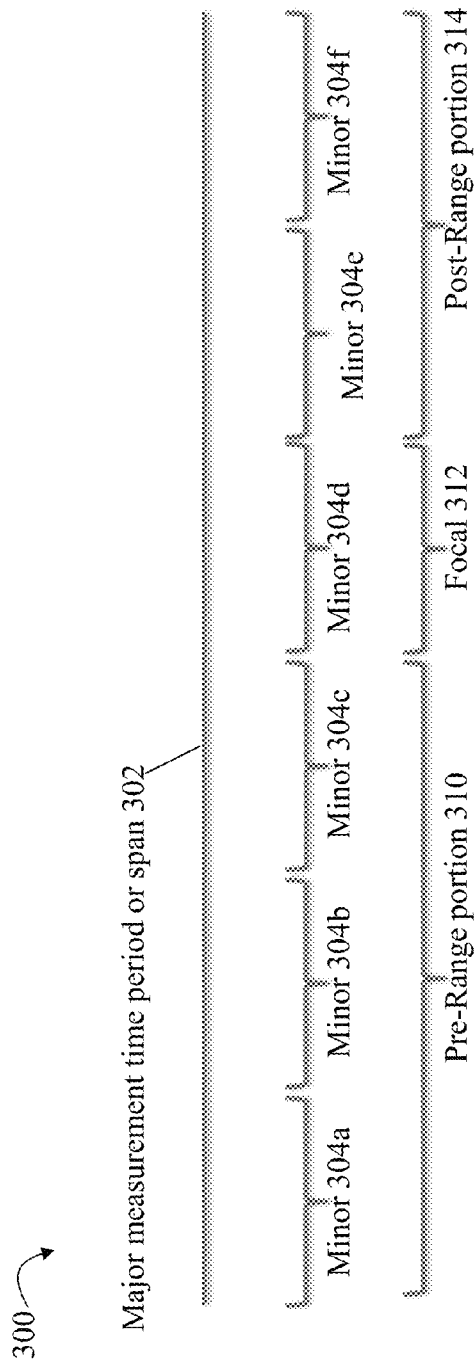
FIG. 8 is an example illustrating use of major and minor measurement time periods in connection with techniques herein.

With reference now to FIG. 8, illustrated in the example 300 is a major measurement time period or span 302 which includes a plurality of minor measure time periods or spans 304*a-f*. Each minor measure time period 304*a-e* may span a relatively small period of time, such as 10 minutes, over which observed performance data may be collected. The performance data collected for each minor measurement period 304*a-f* may include the average IOPS, the average transfer rate for reads, the average transfer rate for writes, the average read RT and the average write RT calculated over the performance data observed during that particular minor measurement time period. Each major measurement period 302 may include any suitable number of minor measurement time periods and associated sets of minor measurements over which a set of major measurements is calculated. In the example 300, the major measurement time period or span 302 is illustrated as including 6 minor measurement periods. If each minor measurement period is 10 minutes as noted above, the major measurement time period may be 1 hour or 60 minutes. The major measurement time period 302 defines a time period over which a set of major measurements are calculated based on, or derived from, a set of minor measurements for a number of consecutive minor measurement time periods. For each major measurement time period 302 including minor measurement time periods 304*a-f*, one of the minor measurement time periods may be selected as the focal minor measurement 312. Once a focal minor measurement 312 is selected, the one or more minor measurement periods preceding 312 may be grouped into a pre-range portion 310, and the one or more minor measurement periods subsequent to 312 may be grouped into a post-range portion 314. With reference to FIG. 8, the focal 312 is minor measurement period 304*d*, the pre-range portion includes minor measurement periods 304*a-c* and the post-range portion 314 includes minor measurement periods 304*e*, 304*f*. Thus, the major measurements for 302 represent collected or aggregated performance data for a number of consecutive minor measurement time periods.

For each major measurement time period 302, major measurements may include read and write activity or performance data. The read activity or performance measurements for the major measurement time period are those of the focal minor measurement time period 312. For the major measurement time period, the major read measurements include the average read RT, average IOPS for reads, average data transfer rate for reads which are those of the focal minor measurement period 312.

The write activity for the major measurement time period 302 is based on the minor measurements for 304*a-f* modified to approximate the back-end write activity. Additionally, a BE write status is determined for each major measurement period 302 where the status is one of the following sustainable, non sustainable/unsustainable, or uncertain. These BE write statuses are described below in more detail. Thus, determining the write activity or performance data for a major measurements may include a first step whereby the BE write status is determined. The BE write status is based on a determination of whether delayed writes have occurred during particular minor measurements of the major measurement time period 302.

A delayed write may be characterized as a write to the external data storage system from the primary data storage system where the write data cannot be immediately cached in the external system (e.g., there is insufficient cache available to store the write data) so there is a delay introduced until a cache location becomes available to store the write data (thereby increasing the RT). Thus, the delayed write may be detected by observing RTs for writes from the primary to the external system whereby the write RT as measured from the primary system is more than the overhead or baseline amount of time to write the data to the external system's cache when a cache location is available to store the write data, and then return an acknowledgement of completion to the primary system. In other words, the baseline amount of time may be defined as the amount of time it takes to transfer the write data from the primary system to the external system, write the data immediately to cache on the external system in an available cache location (assuming write back caching where data is destaged later from cache and cache is available for storing the write data so there is no additional time introduced waiting for a cache location to become available) and return to the primary system. This may be determined in any suitable manner such as through observing an amount of time for writing to the external system under such conditions where the write data would be immediately cached and then return an acknowledgement to the primary system. An embodiment may also estimate this baseline amount of time based on a typical or average expected transfer rate (e.g., a typical amount of time to perform the data transfer between the primary and external systems for a particular type of connection such as a Fibre channel connection).

Returning now to the first step of determining a BE write status, if there are one or more delayed writes in the pre-range portion the BE write status is uncertain. If there are no delayed write in the pre-range portion but there is one or more delayed writes in the post-range or focal, then the BE write status is unsustainable. If there are no delayed writes in any minor measurement time periods, the BE write status is sustainable.

As a second step, averaging of one or selected sets of minor measurements is performed. The particular set(s) of minor measurements selected depends on the BE write status determined in the first step as described above. If the BE write status is uncertain or sustainable, then the selected minor measurements averaged are those for the focal and the post-range whereby the post range is included only if the write rates (e.g., both write IOPS and write data transfer rate) for those minors are both below those of the focal measurement. It should be noted that an embodiment may perform processing to include portions of the post range by traversing the minor measurement(s) of the post range forward in time (with respect to the focal point time) and determining whether each minor measurement in the post range meets the specified criteria of the write IOPs and write data transfer for that minor measurement period being below corresponding values of the focal measurement. The minor measurement of the post range may be included if it meets the above-mentioned criteria. Processing may continue to traverse the minor measurements of the post range marching forward in time until either the end of the post range is reached, or the first minor measurement is encountered in the post range having write IOPS and write data transfer rates which exceed corresponding values for the focal point. Once such a minor measurement in the post range is determined, or the end of the post range is reached, no further minor measurements of the post range are considered. It should also be noted that the criteria or metrics use may include both the write IOPS and write data transfer rate as noted above. Alternatively, an embodiment may optionally use only write IOPS rather than both write IOPS and write data transfer rates.

If the BE write status is unsustainable, then the selected minor measurements averaged include all minor measurements for all minor measurement time periods in the major measurement time period whereby the measurements from the pre-range are only included if their write rates (e.g., both write IOPS and write data transfer rate) are greater than those of the focal measurement. The post-range is always used for BE write status of unsustainable. It should be noted that an embodiment may perform processing to include portions of the pre-range by traversing the minor measurement(s) of the pre-range backward in time (with respect to the focal point time) and determining whether each minor measurement in the pre-range meets the specified criteria of the write IOPs and write data transfer for that minor measurement period being below corresponding values of the focal measurement. The minor measurement of the pre-range may be included if it meets the above-mentioned criteria. Processing may continue to traverse the minor measurements of the pre-range marching backward in time until either the end of the pre-range is reached, or the first minor measurement is encountered in the pre-range having write IOPS and write data transfer rates which exceed corresponding values for the focal point. Once such a minor measurement in the pre-range is determined, or the end of the pre-range is reached, no further minor measurements are considered. It should also be noted that the criteria or metrics use may include both the write IOPS and write data transfer rate as noted above. Alternatively, an embodiment may optionally use only write IOPS rather than both write IOPS and write data transfer rates.

By averaging the write metrics of the selected minor measurement set(s) for the major measurement time period, values may be determined for the average IOPS for writes, average transfer rate for writes, and the average RT for writes for the major measurement time period.

Figure 9:
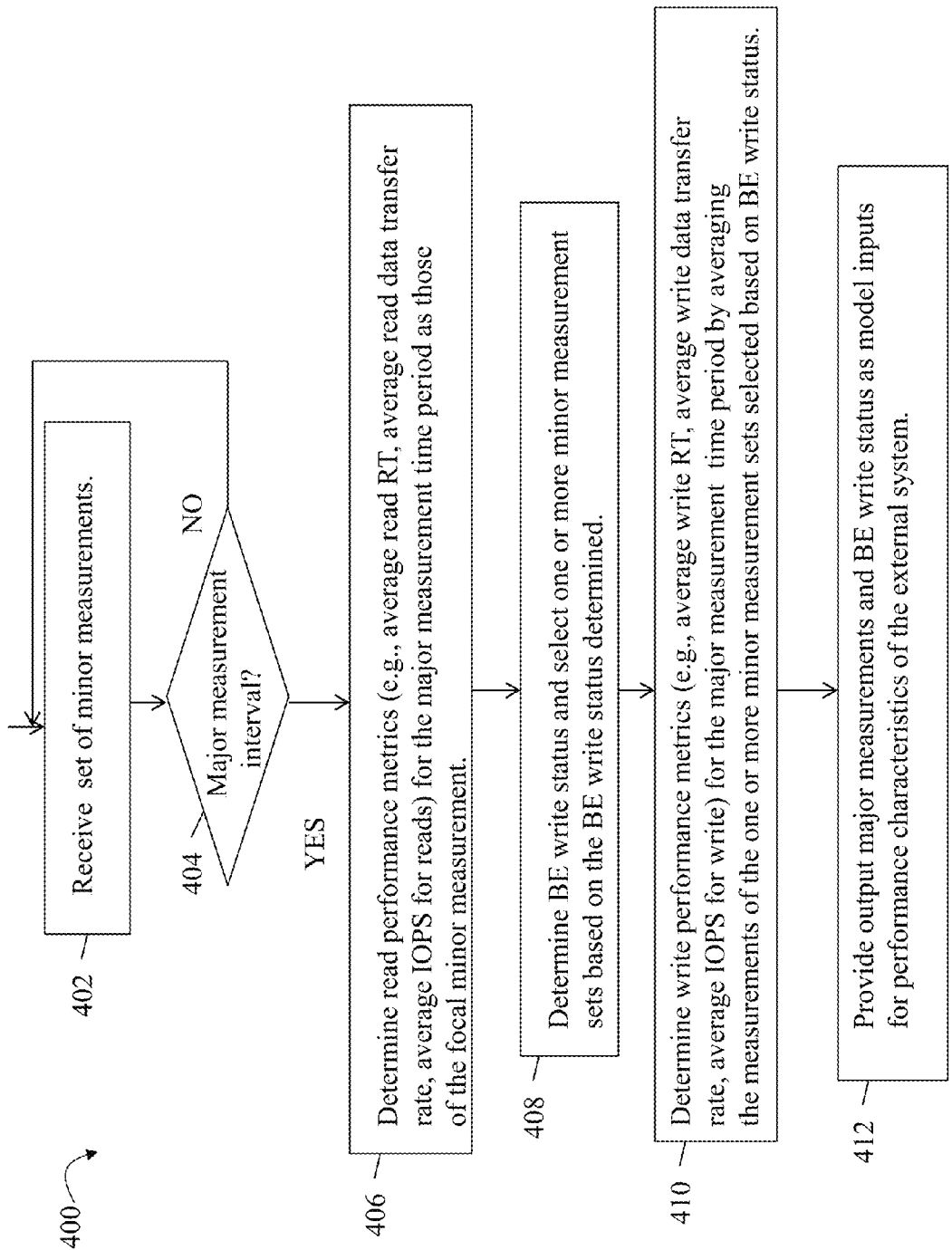
FIGS. 9, 12, 13 and 14 are flowcharts of processing steps that may be performed in an embodiment in accordance with techniques herein.

Referring to FIG. 9, shown is a flowchart of processing steps that may be performed in an embodiment in accordance with techniques herein in accordance with the major/minor measurement technique just described above. As noted above, the steps of the flowchart 400 may be performed in connection with obtaining BE performance related measurements represented as a set of values for a major measurement period. At step 402, a set of minor measurements is received. At step 404, a determination is made as to whether a sufficient number of minor measurements have been received for a next major measurement interval. If step 404 evaluates to no, control proceeds to step 402. If step 404 evaluates to yes, control proceeds to step 406 to determine the read performance metrics for the major measurement period as those of the focal minor measurement. At step 408, a BE write status is determined and one or more minor measurement sets are selected based on the BE write status determined. The minor measurements sets selected based on BE write status and then used in determining the write activity or performance data for the major measurement period are described above in connection with FIG. 8. At step 410, the write performance metrics for the major measurement time period are determined by averaging the write metrics of the one or more minor measurement sets selected based on BE write status in step 408. At step 412, the major measurements and the BE write status may be provided as inputs to the model for BE performance characteristics of the external system.

As described above, any suitable amount of time may be selected for each minor measurement time period and the major measurement time period. Generally, the amount of time for the major measurement time period may be proportional to the size of the cache. An embodiment may select a major measurement time period, such as an hour, which is sufficient for delayed writes to occur in most caches as based on relevant parameters such as typical or average cache size, RAID configuration and BE throughput limit or upper bound on the whole (e.g., average or typical BE throughput limit for given I/O size/amount of data and generally how quickly the BE can process or drain cached write data and destage the cached write data to PDs). In connection with modeling, the major measurement time period should be large enough to allow for delayed writes to occur since, if there are no delayed writes, then the write RTs observed do not provide any insight regarding the BE. More formally, the size of the major measurement time period (MAJOR TIME) used in an embodiment may be proportional (e.g., $\propto$) to the above-mentioned parameters and represented as in EQUATION 1:

$$\text{MAJOR TIME} \propto \text{Size of cache} * \text{RAID multiplier}/(\text{BE write throughput limit} * x)$$

where:

Size of cache is a typical or average cache size;

BE write throughput limit is based on the ability of the BE components (e.g., BE CPUs and PDs) to write cached data to PDs;

RAID multiplier is a factor introduced based on a particular RAID configuration which affects the amount of time the BE takes to process cached writes (e.g., drain the cache). For example, RAID 1 may introduce a factor of 2 since there is mirroring/two data writes. RAID-5 or RAID-6 may introduce addition processing for additional reads and writes for parity and user data; and x is some value in the inclusive range of (0 . . . 1) and denotes some degree of locality with respect to the data being written out to PDs. Values of x closer to 1 indicates a higher degree of locality on a same PD.

The foregoing major/minor measurement technique may be used to generate an aggregated set of backend performance data which is a set of values for a major measurement time period. The major/minor measurement technique may be used to process sets of minor measurements where the performance data of the minor measurements is from a FE perspective in order to generate BE performance data. Such BE major measurement data may then be used an input to the model as BE-related performance data to update selection of drive technology and used to track information about throughput limits from the perspective of IOPs and data transfer (throughput (e.g., IOPS) and data transfer limits or upper bounds for BE level components). Techniques for both selection of drive technology (which may also more generally be referred to as selection of a performance classification) and tracking throughput limits are described in more detail in following paragraphs. Additionally, front end performance data for minor measurements may be used an input to the model directly to track information about throughput limits from the perspective of IOPs and data transfer for FE level components (throughput and data transfer limits or upper bounds for FE level components) without performing the major/minor measurement technique since the major/minor measurement technique is performed to facilitate aggregation of write data for approximating BE write rates. The major/minor measurement technique may be used to aggregate a set of measurements observed for I/Os such as directed to a particular LUN to collectively represent such data as an input to the model for use with modeling BE components of the logical path of components traversed when processing I/Os for the LUN. For example, with reference back to FIG. 7, assume LUN A has its data stored on disk 220a-b. The major/minor measurement technique may be used to aggregate performance data based on observed FE performance data obtained in connection with I/Os directed to LUN A. As an output, the major/minor measurement technique generates major measurement data represented BE performance data feeding as an input to the model. Such BE performance data (as generated by the major/minor measurement technique) may be used in modeling the cache 216, BE component 222d, and PDs 220a-b upon which LUN A's data resides. The FE minor measurement data may be used directly as an input to the model in connection with modeling the FE components 212a, 214b without requiring processing of such data by the major/minor measurement technique.

It should also be noted that if the performance data observed may already be expressed in terms of BE-related values rather than FE-related values. In this case, the major/minor measurement technique is not needed since the performance data is already expressed in terms of BE-related values such as related to BE read and BE write activity. In one aspect, the major/minor technique may be characterized as not only aggregating performance data for use in modeling the BE, but also further modeling or simulating BE read and BE write activity from minor measurement performance data which is observed from a FE perspective.

Modeling techniques herein may use characteristic or modeled performance curves for different drive technologies. In connection with techniques herein as mentioned above, response time may be considered as performance criteria alone, or in combination with other performance criteria. The techniques herein consider different performance characteristic information and curves that may vary with each storage tier, type of physical device, device vendor, and the like. In particular, performance curves for the different storage tiers may be determined and used to model or characterize a target tier. As an example, consider an input workload of N I/O operations/second. The resulting response time experienced for the same workload varies with storage tier due to the underlying capabilities of each tier's technology. As such, performance curves may be used in connection with techniques herein to model expected response times if a particular data movement is performed in accordance with candidate promotion and demotion thresholds.

Figure 10:
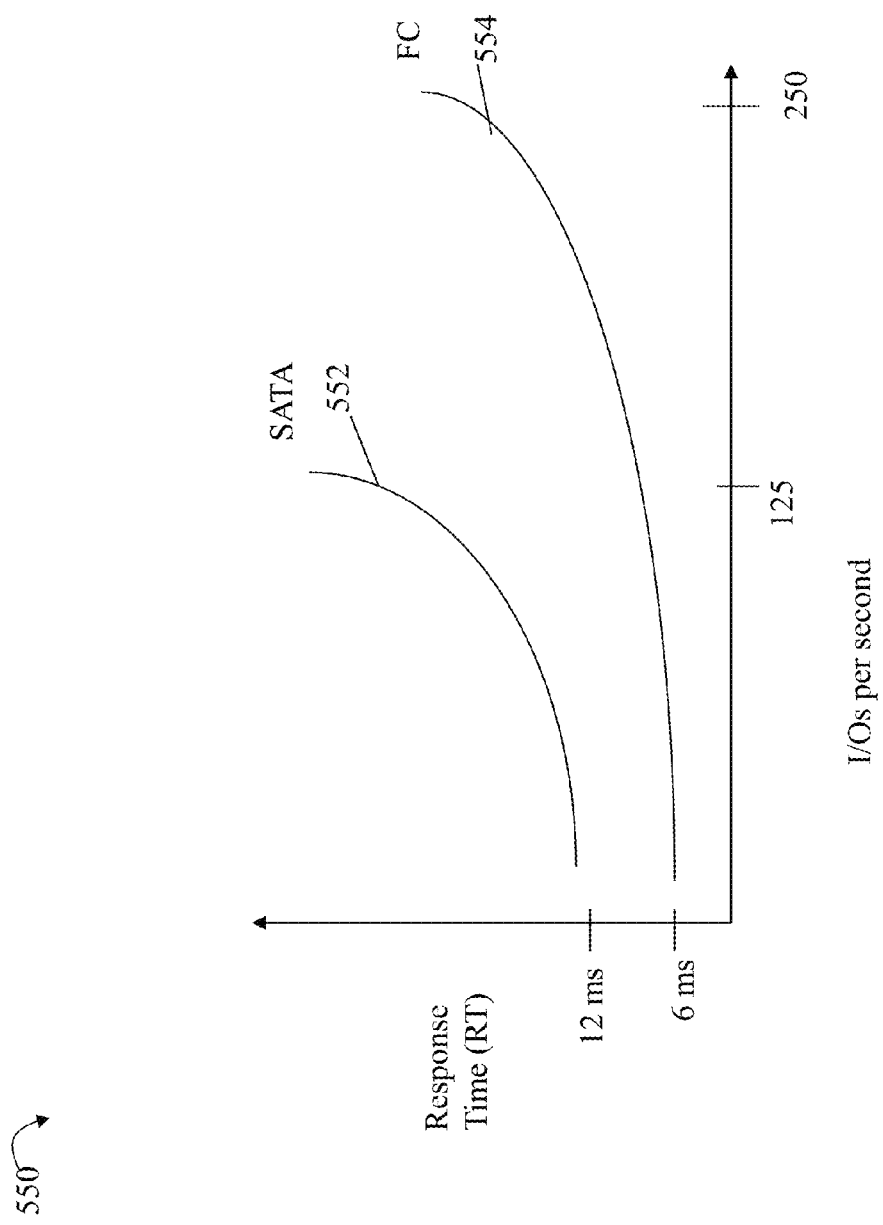
FIGS. 10 and 10A-10E are examples of performance curves that may be used to model device response time and in selection of weights for scoring calculations in an embodiment in accordance with techniques herein.

Referring to FIG. 10, shown is an example of performance characteristic information illustrated in the form of curves for different storage tiers such as may be based on different disk drive types. The example 550 illustrates general curve shapes as may be associated with a SATA drive (as represented by 552) and an FC disk drive (as represented by 554) in connection with processing rate (X-axis in terms of IOs/second) vs. response time (Y-axis). As may be seen from the illustration 550, for a same processing rate of I/Os/second, different RTs are obtained for each of a SATA drive and an FC disk drive. As such, when moving data storage tier of SATA drives to a storage tier of FC drives, differences in performance characteristics such as response times are taken into consideration in accordance with techniques herein. An embodiment may store data as represented by the curves of FIG. 10 in one or more tables having rows and columns of data point values (e.g., X and Y coordinates for a plurality of points). When stored in tabular form, interpolation, curve fitting techniques, and the like, may be used in connection with determining values of X and Y coordinates lying between two existing points stored in the table. When considering moving data between devices of different types or more generally having different device characteristics, such tables of performance characteristic information may be used to determine, for a given processing rate of I/Os per second, a modeled RT for each of the different device types. For example, consider a first storage tier of SATA drives and a second storage tier of FC disk drives. In modeling performance based on a proposed data movement, an aggregated or total processing rate for each target tier may be determined, for example, using performance data collected. For such a total processing rate on the X-axis, a corresponding modeled RT value (Y-axis) may be obtained for each storage tier using tables or curves, such as illustrated in FIG. 10. An embodiment may use appropriate performance curves for each of the different storage tiers and associated technologies of the tiers. The performance curves may be obtained for each storage tier based on observed or collected data through experimentation. The particular parameters or metrics of collected data used to obtain performance curves to model expected RT may vary with storage tier and underlying technology. For example, as described in U.S. patent application Ser. No. 12/924,361, filed Sep. 24, 2010, TECHNIQUES FOR MODELING DISK PERFORMANCE, which is incorporated by reference herein, performance curves for modeling response times for disk drives is described using total number of I/Os and I/O size. Other technologies such as flash-based drives may use other parameters in modeling to determine the appropriate performance curve. For example, one approach to modeling flash-based drives may utilize observed performance data related to total number of I/Os, I/O size, and a ratio of read operations/write operations. Additionally, data modeling for different storage drives may utilize a feedback process. At a point in time, there is a set of data representing the performance curve for a particular drive. The actual measured RT of the drive for a given workload in terms of I/Os per second, for example, may be compared to a modeled RT value determined using the performance curve for similar model parameter values. Adjustments may be made to the modeled performance curve based on differences between the measured RT and modeled RT.

In connection with FIG. 10, it should be noted that the performance curve of modeled response time is a function of I/O rate (e.g. IOPS or I/Os per second). Performance curves may also be modeled for response time as a function of IOPS and also I/O size for the different storage tiers (e.g., physical device characteristics of physical devices in a particular tier).

Figure 10A:
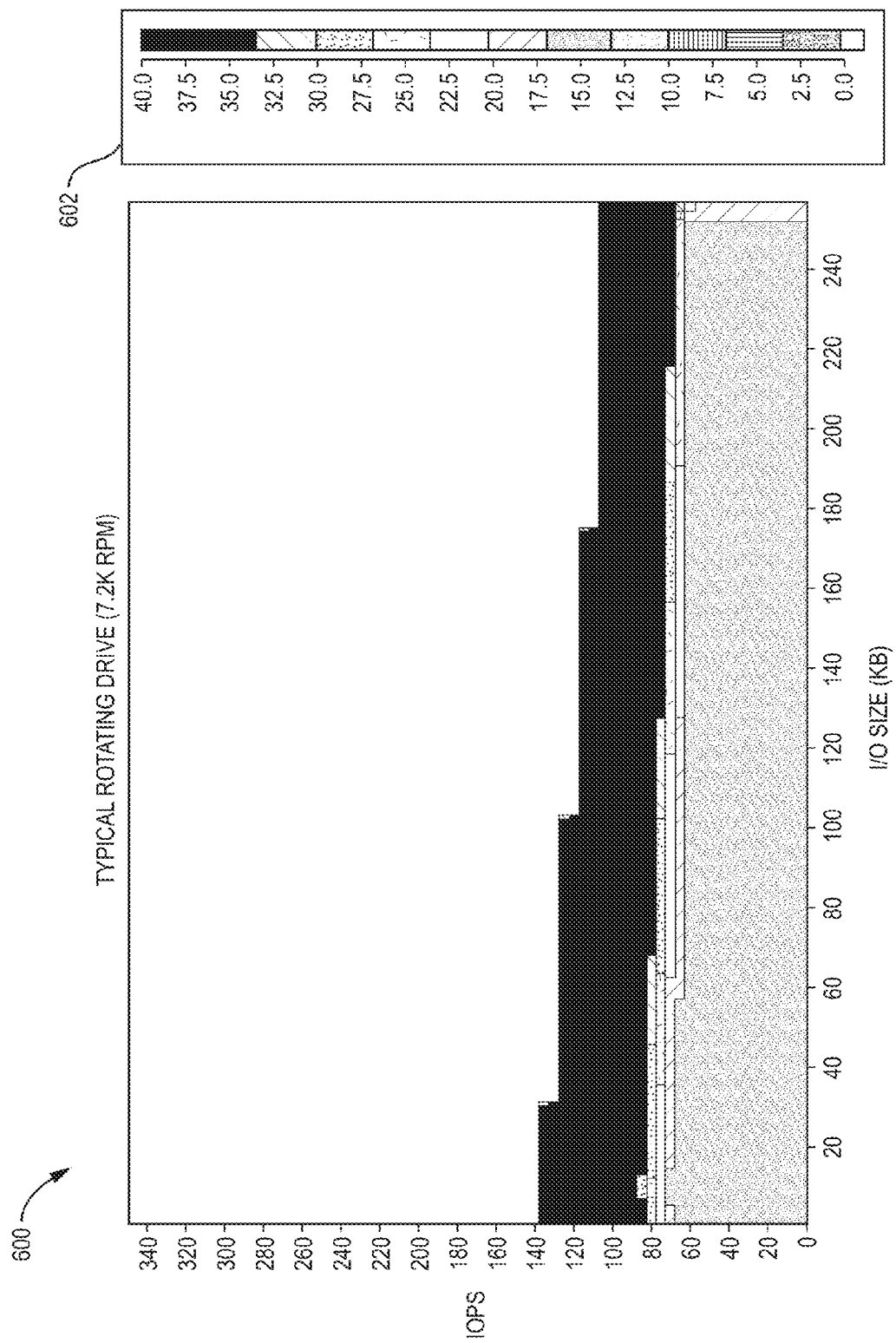

Referring to FIG. 10A, shown is an example 600 illustrating a performance curve for modeled response time as a function of IOPS (Y-axis) and I/O size (average for physical drive in kilobytes (KBs)) for a 7.2K RPM rotating drive. Element 602 illustrates a scale of response times from 0-40 milliseconds where the particular pattern indicated on the scale for a response time is denoted on the X-Y graph of 600 for various combinations of IOPs and I/O sizes. Based on the example 600, it may be generally observed that the I/O size does not have a significant or substantial impact on response time (e.g., response time is not highly dependent on, or sensitive to changes in, I/O size) for the particular physical drive.

Figure 10B:
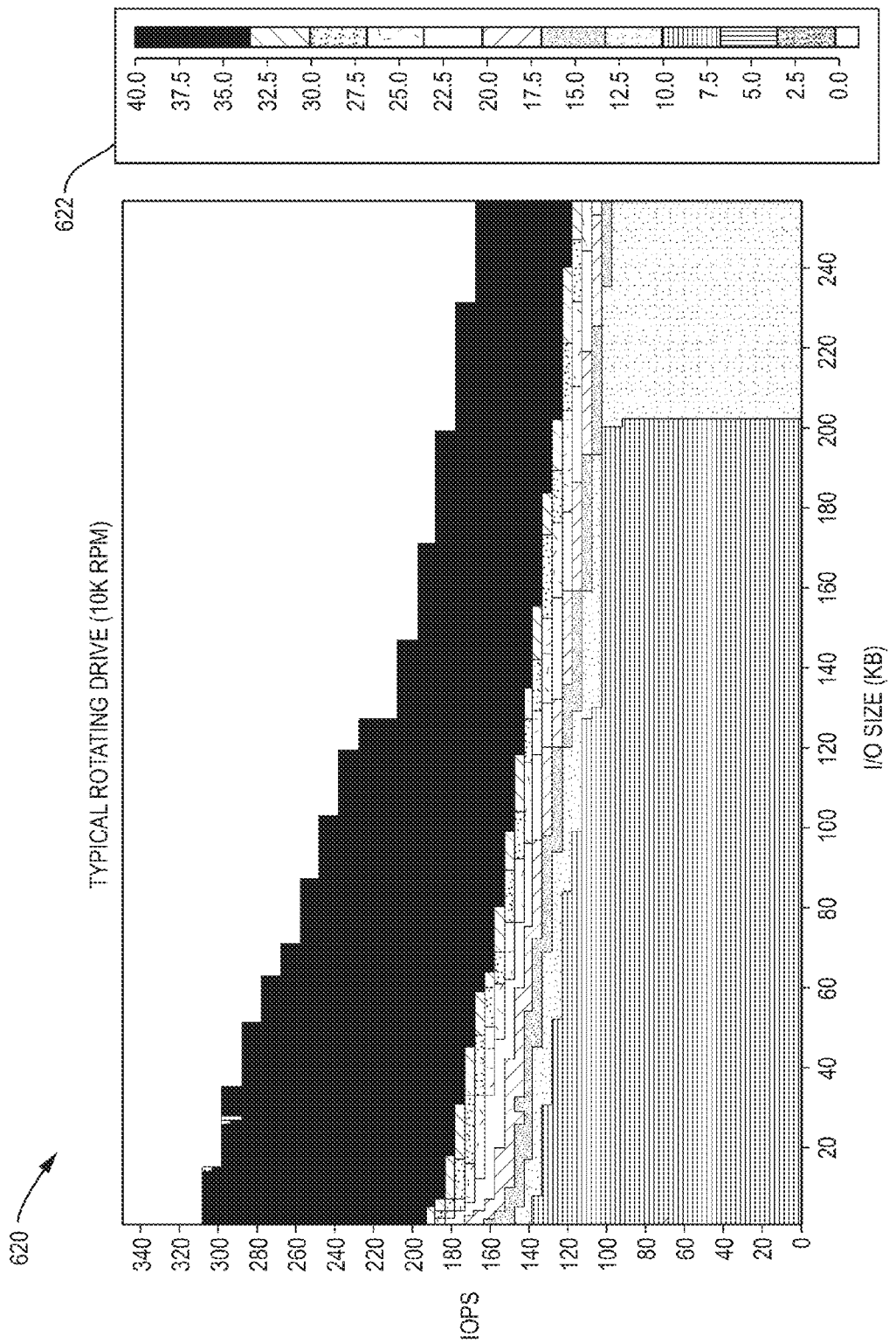

Referring to FIG. 10B, shown is an example 620 illustrating a performance curve for modeled response time as a function of IOPS (Y-axis) and I/O size (average for physical drive in kilobytes (KBs)) for a 10K RPM rotating drive. Element 622 illustrates a scale of response times similar to 602 where the particular pattern indicated on the scale for a response time is denoted on the X-Y graph of 620 for various combinations of IOPs and I/O sizes. Based on the example 620, it may be generally observed that I/O size for the 10K RPM rotating disk drive has a slightly greater dependency than that of FIG. 10A but that the I/O size for the 10K RPM does not have a significant or substantial impact on response time (e.g., response time is not highly dependent on, or sensitive to changes in, I/O size) for the particular physical drive.

Figure 10C:
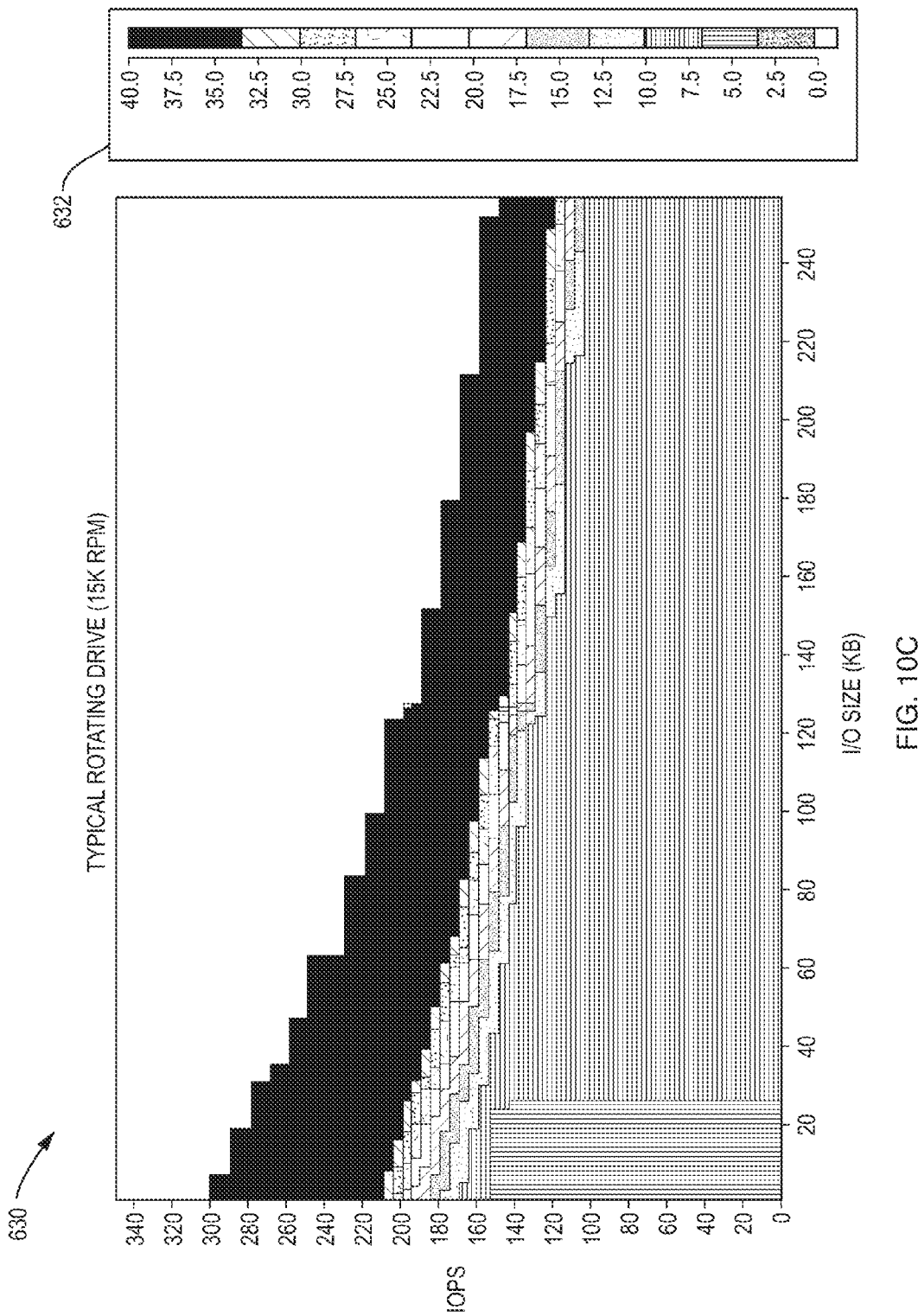

Referring to FIG. 10C, shown is an example 630 illustrating a performance curve for modeled response time as a function of IOPS (Y-axis) and I/O size (average for physical drive in kilobytes (KBs)) for a 15K RPM rotating drive. Element 632 illustrates a scale of response times similar to 602 where the particular pattern indicated on the scale for a response time is denoted on the X-Y graph of 630 for various combinations of IOPs and I/O sizes. Based on the example 630, it may be generally observed that I/O size for the 15K RPM rotating disk drive has a slightly greater dependency than that of the 10K RPM drive of FIG. 10B but that the I/O size for the 15K RPM does not have a significant or substantial impact on response time (e.g., response time is not highly dependent on, or sensitive to changes in, I/O size) for the particular physical drive.

Figure 10D:
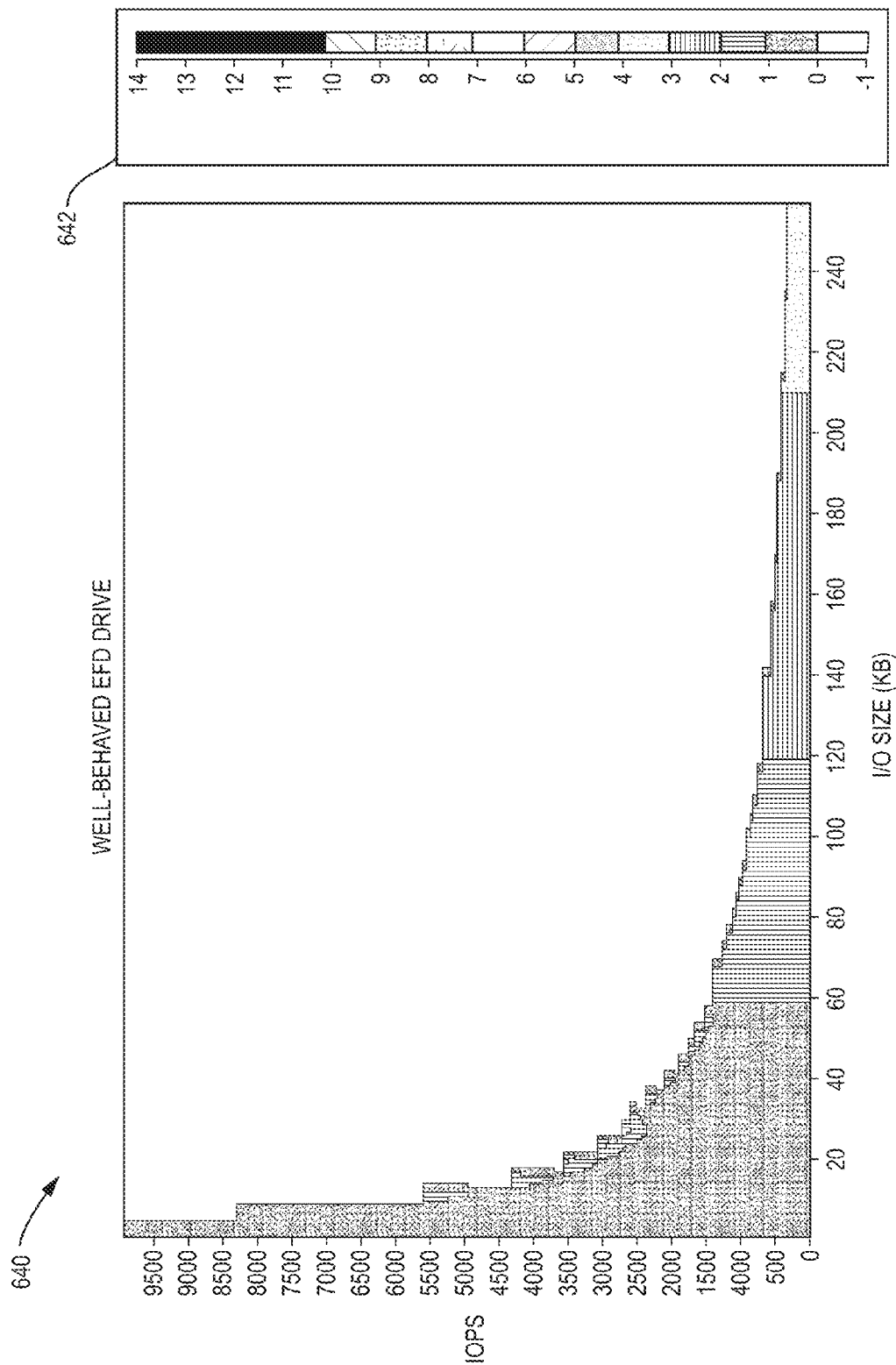

Referring to FIG. 10D, shown is an example 640 illustrating a performance curve for modeled response time as a function of IOPS (Y-axis) and I/O size (average for physical drive in kilobytes (KBs)) for an exemplary SSD drive such as an EFD. Element 642 illustrates a scale of response times similar to 602 where the particular pattern indicated on the scale for a response time is denoted on the X-Y graph of 640 for various combinations of IOPs and I/O sizes. Based on the example 640, it may be generally observed that I/O size for the EFD has a significant or substantial impact on response time (e.g., response time is highly dependent on, or sensitive to changes in, I/O size) for the particular physical drive.

Figure 10E:
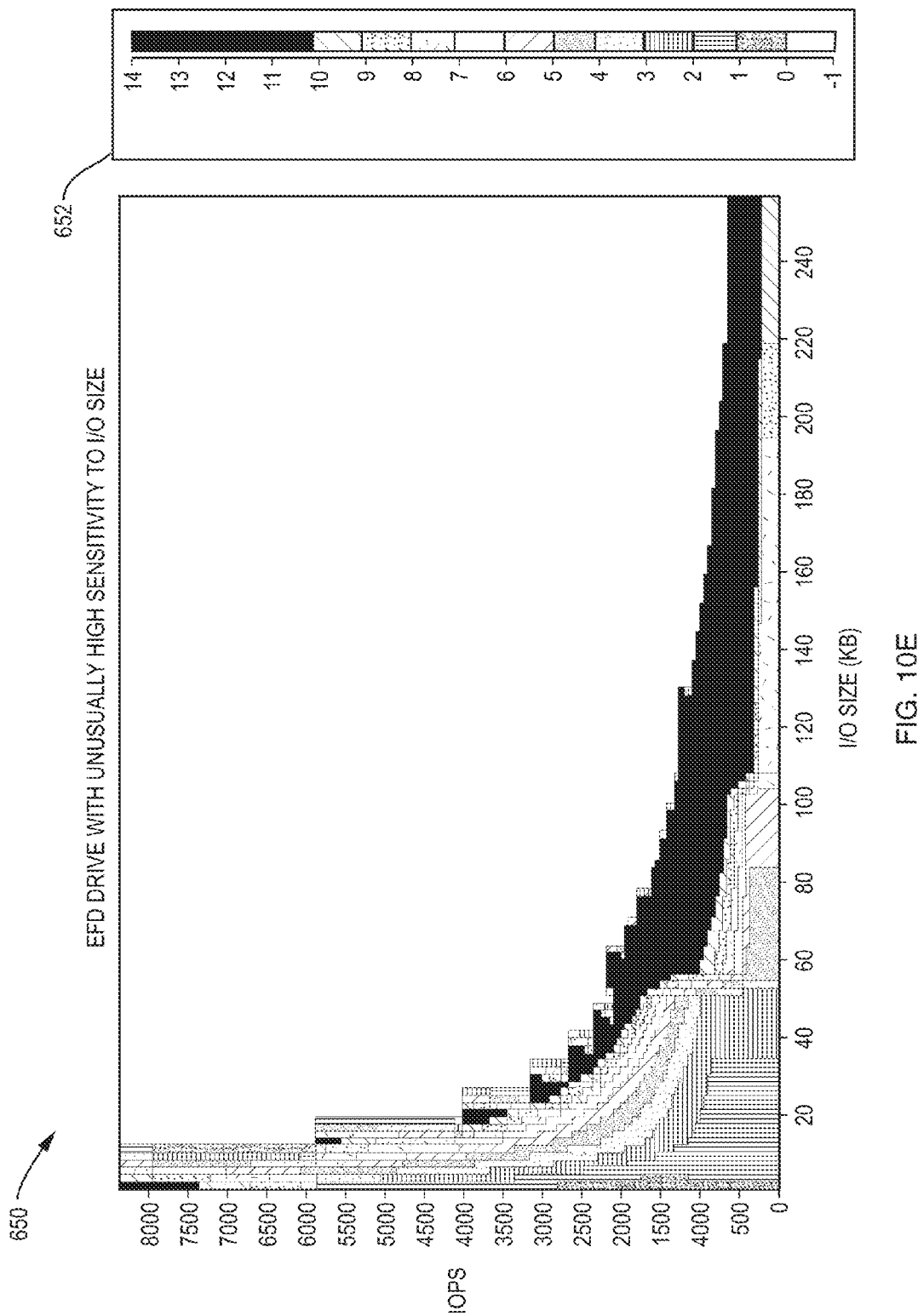

Referring to FIG. 10E, shown is an example 650 illustrating a performance curve for modeled response time as a function of IOPS (Y-axis) and I/O size (average for physical drive in kilobytes (KBs)) for another exemplary SSD drive such as an EFD. The example 640 of FIG. 10D may represent the modeled performance curve for one type of EFD such as by one vendor based on one vendor's technology and implementation and the example 650 of FIG. 10E may represent modeled performance curve for another type of EFD such as by a different vendor or EFD drive with different performance characteristics than that modeled in FIG. 10D. Element 652 illustrates a scale of response times similar to 602 where the particular pattern indicated on the scale for a response time is denoted on the X-Y graph of 650 for various combinations of IOPs and I/O sizes. Based on the example 650, it may be generally observed that I/O size for the EFD has a significant or substantial impact on response time (e.g., response time is highly dependent on, or sensitive to changes in, I/O size) for the particular physical drive.

In connection with estimating modeled response times, performance curves such as that of FIGS. 10, and 10A-130 may be used based on the particular parameters considered when modeling the response times.

What will now be described are techniques that may be used in connection with throughput limit tracking characterizing the limits or upper bounds possible in connection with IOPS and data transfer for FE and BE level components. In this manner, the techniques described may be performed separately for modeling FE components and then again in connection with determining such limits with respect to the BE components. With respect to FE components, a single set of limits may be maintained in the model for FE components.

In connection with modeling the BE components, the BE throughput limits for IOPS and data transfer may depend on various aspects of the BE components such as the drive technology and number of drives, number of BE CPUs, and the like. As such tracking the BE throughput limits are one way of modeling the capability of these BE components collectively. In a similar manner, the FE throughput limits for IOPS and data transfer is one way of modeling the capability of the FE components collectively.

For BE throughput limit tracking, the major measurements may be used. For FE throughput limit tracking, the minor measurements may be used directly rather than major measurements since major measurements reflect the BE activity.

In connection with modeling BE components, the BE IOPS and data transfer limits may be generally represented as in the following EQUATION 2:

$$\text{BE IOPS and data transfer limits} = f(\text{drive technology}, \text{RAID type}, \#\text{PDs}, \#\text{BE CPUs}, \#\text{BE ports to PDs}, \ldots)$$

where the BE IOPS and data transfer limits may be represented as a function "f" dependent on criteria or factors including drive technology or performance classification (e.g., EFD, FC or SATA), RAID type (e.g., RAID 1, 5, 6), # (number) of PDs, # BE CPUs, #BE ports to PDs, and possibly other criteria. In connection with modeling techniques herein, the model may maintain a set of such limits for BE modeling for each unique combination of drive technology and RAID type possible for each LUN being modeled. For example, if possible RAID levels for a LUN are RAID 1 and RAID 5, and possible drive technologies or performance classifications are EFD and FC, the embodiment may track 4 sets of throughput limits, one for each unique combination of RAID level and drive technology.

Processing will first be described with respect to BE IOPS and data transfer limits. Overload may be present in a data storage system when either there are delayed writes (e.g., observed write RT>transfer time or baseline time for transfer between external and primary DS) and/or there are observed read RTs that are at the "high" end (e.g., nearing or within some threshold of the a characteristic maximum possible read RT) for the given technology assumption/selection being modeled. In this manner, overload with respect to writes may occur if the major measurement processing determined a BE write status of UNSUSTAINABLE or, if the major measurement read RT is at the upper end of a modeled performance curve given the particular drive technology. It should be noted that some read RTs and/write RTs observed may be large enough that overload has to exist for any drive technology.

For a given major measurement set, processing may be performed to determine a first total or aggregate IOPs rate for read and writes (IOPS rate) by adding the average IOPS for reads to the average IOPS for writes for the major measurement. Similarly, a second total or aggregated data transfer rate for reads and writes (data transfer rate) by adding the average data transfer rate for reads to the average data transfer rate for writes for the major measurement. For each major measurement, the system keeps track of the lowest total IOPS rate with overload AND the highest IOPS rate without overload over all major measurements processed to date. For each major measurement, the system also keeps track of the lowest such aggregated or total data transfer rate with overload AND the highest such aggregated or total data transfer rate without overload over all major measurements processed to date. The foregoing characterizes a set of 4 values representing the minimum/lowest and maximum/highest such values of major measurements processed to a point a time which may be characterized as a raw or current set of values including:

1) the lowest IOPS rate with overload (e.g., single lowest such value of all major measurement periods processed);

2) the highest IOPS rate observed without overload (e.g., single highest such value of all major measurement periods processed);

3) the lowest data transfer rate with overload (e.g., single lowest such value of all major measurement periods processed); and 4. the highest data transfer rate without overload (e.g., single highest such value of all major measurement periods processed).

Additionally, an embodiment may also maintain a second set of the foregoing 4 values which represent a temporal or time-smooth set of values. For example, in connection with 1) the lowest IOPS rate with overload, rather than have the value represent a single such lowest value or instance of all major measurements, an embodiment may use a time or temporal-smoothing technique which may, for example, take an average of a number of such values with respect to major measurements processed to a current point in time. In this manner, the second set of values may provide a set of values derived from multiple values. An embodiment may use any suitable technique for temporal smoothing such as exponential temporal smoothing. Exponential smoothing as a technique known in the art that may be applied to a time series of data. In a single moving average, all past observations are weighted equally. In contrast, with exponential smoothing, exponentially decreasing weights are assigned to an observed value as the observation gets older. In other words, more recent observations are given relatively more weight than the older observations. In the case of moving averages, the weights assigned to the observations are the same and are equal to 1/N. In exponential smoothing, however, there are one or more smoothing parameters to be determined or estimated and these choices determine the weights assigned to the observations. Techniques such as temporal smoothing may be used to reduce noise or other sources of variation in performance values obtained.

Thus, an embodiment may track the above-mentioned raw/regular or current set of 4 values and a second time-smoothed set of 4 values for each unique combination of RAID type and drive technology being modeled for each LUN. For modeling the BE limits, the major measurements may be characterized as PD or BE operations (e.g., reads and writes) which relate to the RAID type. In other words, as described elsewhere herein, a FE write may result in one or more BE reads and/or writes depending on the RAID type. For example, a BE write to a LUN having an underlying PD RAID-1 configuration results in 2 BE writes. Similarly, other RAID types may cause a single FE data operation to result or translate into a different number of BE reads and/or writes (e.g., for parity and data information). Thus, the modeling may provide for converting or translating the major measurements that may be with respect to FE I/O operations to an appropriate equivalent used for modeling into the BE based on the particular RAID type being modeled. As will be appreciated by those skilled in the art, when modeling the FE, such mapping is not needed and the model may use minor measurement data based on FE-based I/O operations. Also, FE modeling of throughput limits only requires maintaining a single set of limits for each LUN since such modeling does not need to account for possible variations as with different RAID level and drive technology combinations. The FE modeling may however maintain and use both a current or raw set of values as well as a time-smoothed set of values for the IOPS and data transfer throughput limit tracking.

Figure 11A:
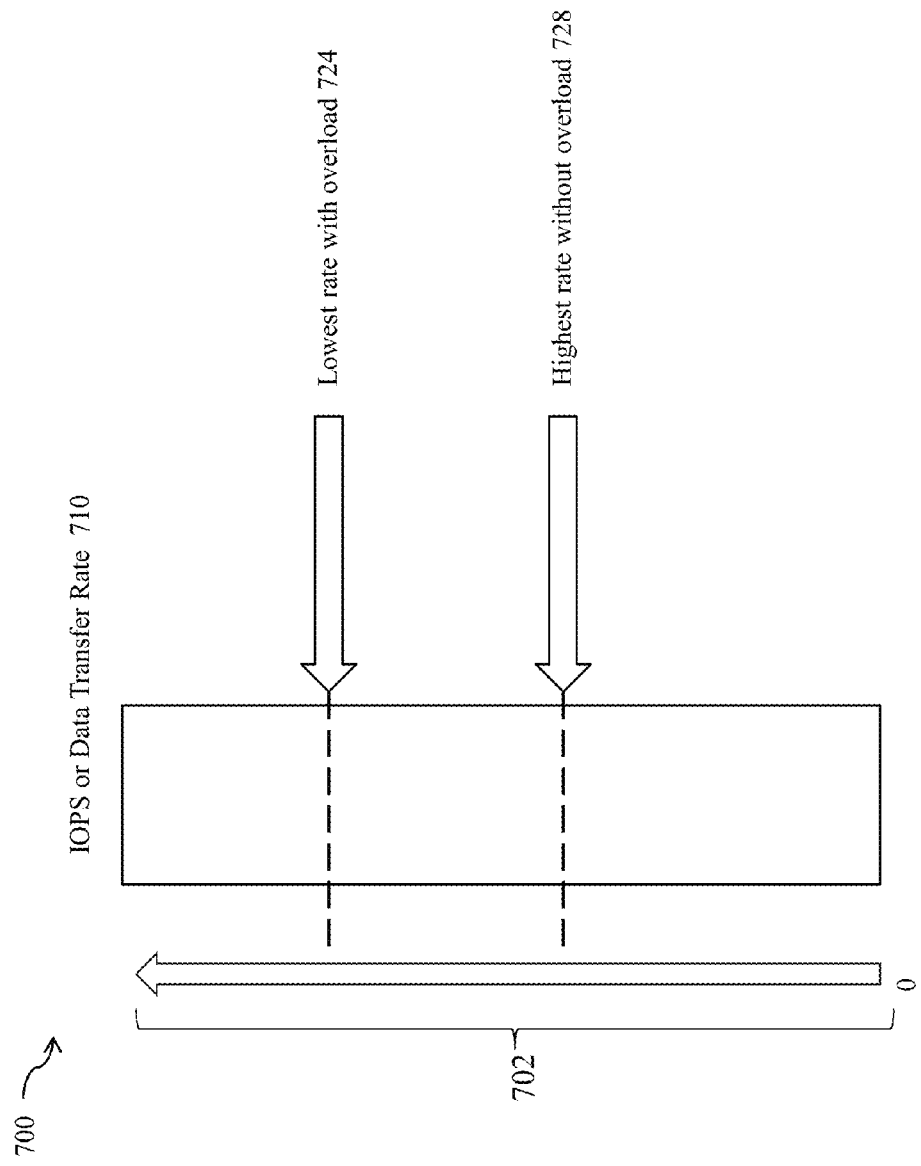
FIGS. 11A and 11B are examples illustrating tracking of IOPS and data transfer rate limits used in connection with modeling throughput limits in an embodiment in accordance with techniques herein.

Referring to FIG. 11A, shown is an example 700 graphically illustrating use of techniques herein for throughput limit tracking as may be performed in an embodiment. The example 700 includes a scale 702 on the left that may represent a general range of increasing values (0 at the bottom with values increasing from bottom to top of the page) for either IOPS or the data transfer rate limit. In other words, an embodiment may use the values noted above of 1) the lowest IOPS rate with overload and 2) the highest IOPS rate observed without overload to maintain a first instance of the limits model as illustrated in the example 700 for BE IOPS. In this case the lowest rate 724 would be the lowest IOPS rate with overload and the highest rate 728 would be the highest IOPS rate with no overload. Similarly, an embodiment may use the values noted above for 3) the lowest data transfer rate with overload, and 4) the highest data transfer rate without overload to maintain a second instance of the limits model as illustrated in the example 700 for modeling BE data transfer rates. Additionally, an embodiment may also maintain such models for both the raw/current set of values and also the time-smoothed values as described above for the BE throughput limit tracking model.

What will now be described is how to use the foregoing BE throughput limit tracking models for making model predictions regarding IOPS, data transfer rates, utilization and RT as well as an indicator regarding the confidence or strength of the prediction. As an input to the model, a workload metric set may be provided for which a prediction may be generated as an output using the model. The workload inputs data may include an average read IOPs, an average write IOPS, an average I/O size (overall Rs and Ws or for each), an average read data transfer rate, and an average write data transfer rate). Based on the workload input data set, the model may be asked to make a prediction. As described, herein the workload input is with respect to I/Os as may be directed to a particular LUN having data stored on one or more PDs of the external system being modeled. The predictions/predicted metric values output by the model are with respect to external data storage system modeled component for the one or more I/O paths to the PDs for the workload I/Os/the particular LUN. For example, I/Os directed to LUN A having data stored on 2 PDs. Predictions made by the model are with respect to the FE and/or BE components traversed on the I/O paths based on the configuration for LUN A. The workload may be in terms BE-based or FE-based I/Os depending on desired values to be predicted.

As an output with respect to the BE throughput limit tracking, utilization may be reported to varying degree (e.g., per component, overall with respect to any component on the path, etc). depending on available configuration information. For example, the BE utilization may represent the utilization of the busiest BE component on the I/O path (max utilization of any BE component on the I/O path). In connection with techniques herein such as for BE throughput limit tracking and modeling, a first utilization may be determined using the BE IOPS limits and a second utilization may be determined using the BE data transfer limits. When calculating the utilization for IOPS using the model for a given workload input data set, the workload input values for read and write IOPs are added and use as a single value for the model. Similarly, when calculating the utilization for the data transfer, the workload inputs values for the read data transfer rate and the write data transfer rate may be added and used as a single value for the model.

Figure 11B:
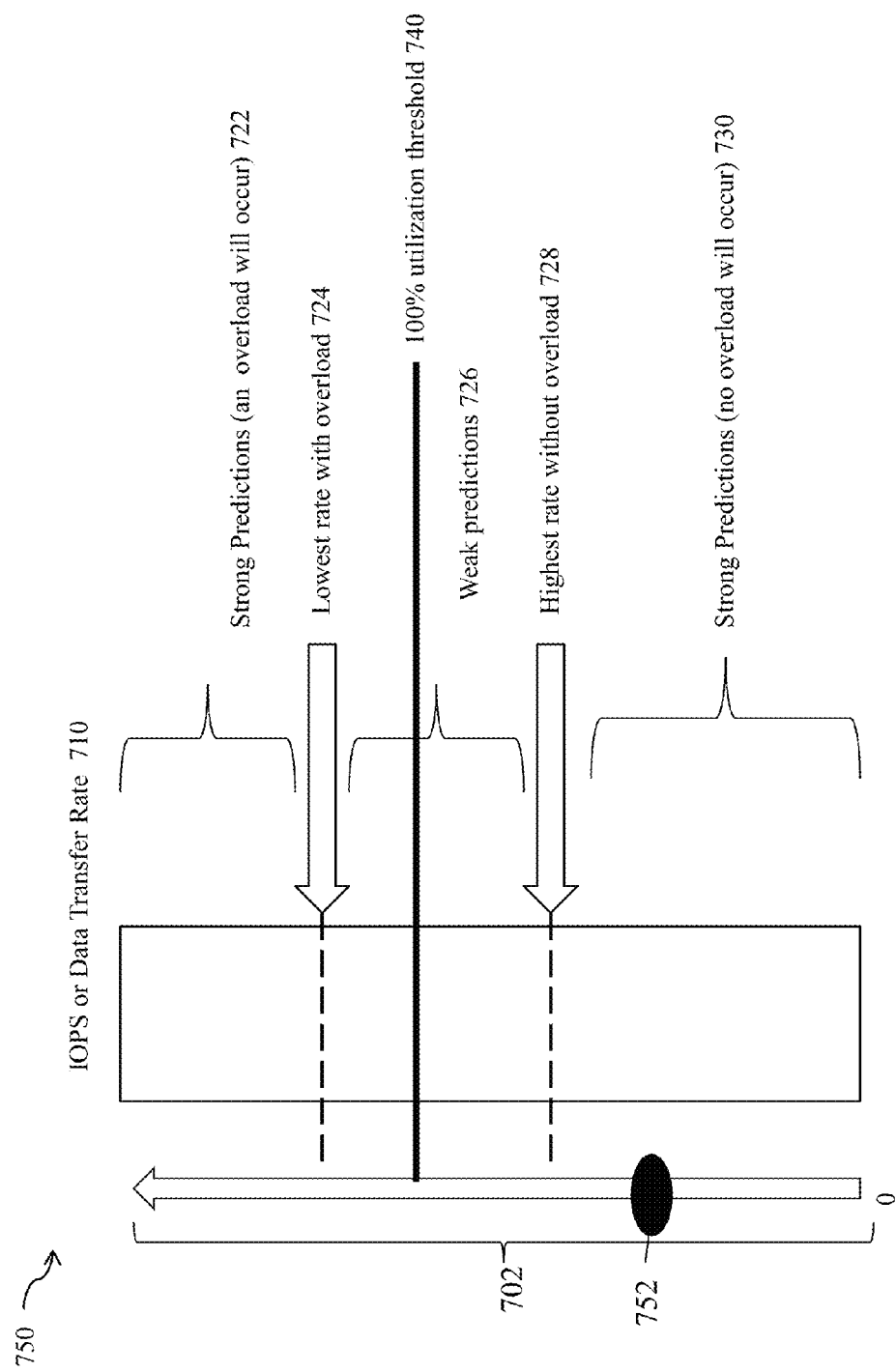

With reference to FIG. 11B, shown is a further modified version of FIG. 11A. In the example 750, the illustrated model has been updated to further include a 100% utilization threshold 740. Consider the case where the model illustrated in 710 represents the tracked IOPS throughput limits. The 100% utilization threshold 740 may represent a near maximum or saturation point of IOPS for the particular drive technology being modeled. For example, reference may be made to the performance curves of FIGS. 10-10E for the different drive technologies to determine approximately where a 100% utilization point may begin in terms of IOPS (e.g., at the approximate knee of where a RT performance curve such as in FIGS. 10-10E begins to bend upward or in a vertical climb). Although the 100% utilization will vary with 10 size as well as number of IOPS, an embodiment may select a value for the 100% utilization threshold 740 that may be made with respect to the average I/O size. An embodiment may generally select any suitable value and use any suitable technique for selecting a value for 740. For example, an embodiment may select the 100% utilization threshold 740 to be the midpoint between the lowest rate with overload 724 and the highest rate without overload 728. It may be that an embodiment has not processed a sufficient amount of data to have values for both 724 and 728. For example, an embodiment may have a single value for 724 but not have any value for 728. In this case, the 100% utilization threshold 740 may be determined based on the single value 724 (such as ½ the value of 724).

The workload input data set provides an average read IOPS and an average write IOPS which has been added to produce a single IOPS value. The single IOPS value may be located on the scale 702 such as denoted by the solid oval 752. The value denoted by 752 may be scaled or interpolated with respect to the IOPS value denoted by the 100% utilization rate to determine a predicted % utilization for the given input workload in terms of the single aggregate IOPS (e.g. average read IOPS added to average write IOPS from input workload data set). In this manner, a first predicted % utilization may be determined based on the IOPS throughput limit model. In a similar manner using the data transfer rate model and summed total of the average read data transfer rate and average write data transfer rate from the workload input data set, a second predicted % utilization may be determined based on the data transfer rate throughput limit model.

At this point, the largest of the foregoing two % utilizations may be selected and used to determine an average or expected RT based on characteristic performance curve for the appropriate drive technology. To further illustrate, assume the largest % utilization selected is based on IOPS utilization/model. A corresponding IOPS rate may determined as described above by scaling or interpolating based on the IOPS rate associated with the 100% utilization threshold for IOPS rate (e.g., utilization %*(#IOPS corresponding to 100% utilization). An appropriate one of the performance curves, such as one of FIGS. 13, 13A-E may be selected for the particular drive technology being modeled. Using the curve and the IOPS rate determined based on the largest % utilization, and also using the average I/O size of the workload input data set, an output of an average RT may be selected as the modeled average RT from the performance curve. Note that the foregoing prediction may be made with respect to the current/raw values and/or the time-smoothed values as used in connection with the modeling. It should be noted that FIGS. 10-10E illustrate RT performance as a function of I/O size and IOPS. Similarly, an embodiment may also have an additional second set of performance curves which provide for determining a RT as a function of the data transfer rate and I/O size. If the largest % utilization selected is based on the data transfer rate utilization/model, the additional second set of performance curves may be used to determine a predicted modeled RT. As yet a further variation, assume that only a single set of performance curves such as in FIGS. 10-10E are available which provide for determining a modeled RT as a function of IOPS and I/O size and that there are no performance curves available providing for modeling RT as a function of data transfer rate and I/O size. In this latter case, an embodiment may determine the maximum of the two utilizations as described above and then use the larger % utilization with the single set of performance curves to determine the modeled RT as a function of I/O size and IOPS. In other words, if the largest of the two % utilizations represents a % utilization based on the data transfer rate model, that largest % utilization may be used as if it were also a % utilization based on the IOPS model as a further modeling simplification. It should be noted that the performance curves such as illustrated in FIGS. 10-10E may be based on a particular mixture or ratio of read and write operations. Thus, an embodiment may include performance curves for RT which are a function of drive technology or performance classification as well as I/O size and IOPS. Since the ratio or mixture of reads and writes as obtained in connection with "raw" observed measurements in this embodiment may differ from that as used in connection with the performance curves, it will be appreciated by those skilled in the art that an embodiment may use interpolation or other techniques to provide for suitable comparison of observed rates to those of the performance curves. For example, an embodiment may have performance curves with RT values for a read to write ratio in terms of IOPS of 50/50 and performance curves for a read to write ratio in terms of IOPs of 30/70. If the ratio of read to write operations for the data set provided is 40/60, RT values obtained from the foregoing may be interpolated.

Additionally, a strength regarding the predicted utilization % and the average RT may be determined based on using rates 724 and 728 as weak and strong prediction boundaries. As illustrated in the example 750, element 730 may denote the area of the prediction value range below rate 728 which is also deemed a strong prediction area. If a workload value falls in the range denoted by 730, the model strongly predicts that no overload will occur. Element 726 may denote the area of the prediction value range between rates 724 and 728 which is deemed a weak prediction area. If a workload value falls in the range denoted by 726, the model's prediction (e.g., prediction of overload or no overload based on whether the workload falls above or below the 100% utilization) is deemed weak. Element 722 may denote the area of the prediction value range above rate 724 which is also deemed a strong prediction area. If a workload value falls in the range denoted by 722, the model strongly predicts that an overload will occur. An overload may be predicted if any of the input workload values for IOPS rate and data transfer rate are above their 100% utilization threshold. Furthermore, the strong prediction areas 722, 730 and weak prediction area 726 may be used in denoting whether the overload or no overload prediction for the input workload is strong or weak. The prediction indicator of strong and weak may be used in connection with determining when the foregoing model has faulted.

A fault may be determined with respect to an incorrect strong prediction regarding overload or no overload as determined based on the weak and strong prediction areas illustrated in FIG. 11B. For example, point 752 denotes the input workload and the model strongly predicts that no overload will occur since the data point 752 falls into the range 702 below the 100% utilization threshold 740. Although not illustrated, if the workload data point 752 rather fell into the range denoted by 722, the model predicts that overload will occur since the data point 752 falls in the range 702 above the 100% utilization threshold 740 and the model indicates that this is a strong prediction. Although also not illustrated, if the workload data point 752 rather fell into the range denoted by 726 and is between 740 and 724, the model predicts that overload will occur since the data point 752 falls in the range 702 above the 100% utilization threshold 740 and the model indicates that this is a weak prediction.

A fault may be determined when the model strongly predicts for a given workload that an overload will or will not occur and such overload/no overload prediction is incorrect. Whether a model prediction is incorrect may be determined using actual observed data. For example, an observed actual data set for a major measurement may be received regarding how the system actually performed (e.g., what was the actual utilization and/or BE read RT) for a given workload. The same workload is then used as an input to the model and the model outputs a prediction regarding the utilization and an associated prediction indicator (e.g., prediction indicator level=WEAK/or Strong AND predicted outcome=OVERLOAD or NO OVERLOAD). If the model predicted an incorrect outcome and the prediction indicator level is strong, then the model has generated a fault.

An embodiment may keep track of the number of faults that occurs for each RAID type throughput limit model. Thus, an embodiment may model throughput limits (e.g., data transfer and IOPS limits) for a number of different possible RAID types (e.g. RAID 1, 5, 6) for each possible drive technology (e.g., EFD, FC, SATA). For example, with the foregoing 3 possible RAID types and 3 possible drive technologies for each LUN, nine throughput limit models may be maintained and faults may be tracked The models (one for each possible RAID and drive technology combination) may be maintained and tested in parallel and fault counts tracked for each of these BE models. After a time period, one of these BE through limit models having the least number of faults may be selected as the correct or "best fit" model for a particular BE of an external DS. Thus, a RAID-type confidence level measurement may be reported for each of the throughput limit models based on the number of faults determined. The lower the number of faults associated with a RAID-type model, the higher the level of confidence. An embodiment may, for example, rank the different RAID-type models for a particular drive technology in order of increasing number of faults and thereby have a ranked list of RAID-type models from highest confidence to lowest confidence for this particular drive technology.

It should be noted that the weak prediction range 726 should narrow over time in a well behaved system.

Thus, FIG. 11B illustrates a model that may be maintained for IOPS and data transfer limits. A first such model may be maintained for the BE and a second such model may be maintained for the FE with respect to each LUN of the external system. Furthermore, a BE model for throughput limits may be maintained for each possible candidate combination of drive technology and RAID type. For a given workload, the FE throughput limit model and each instance of a different BE throughput limit model may be used to output a prediction and may also be tested for faults as described above.

Figure 12:
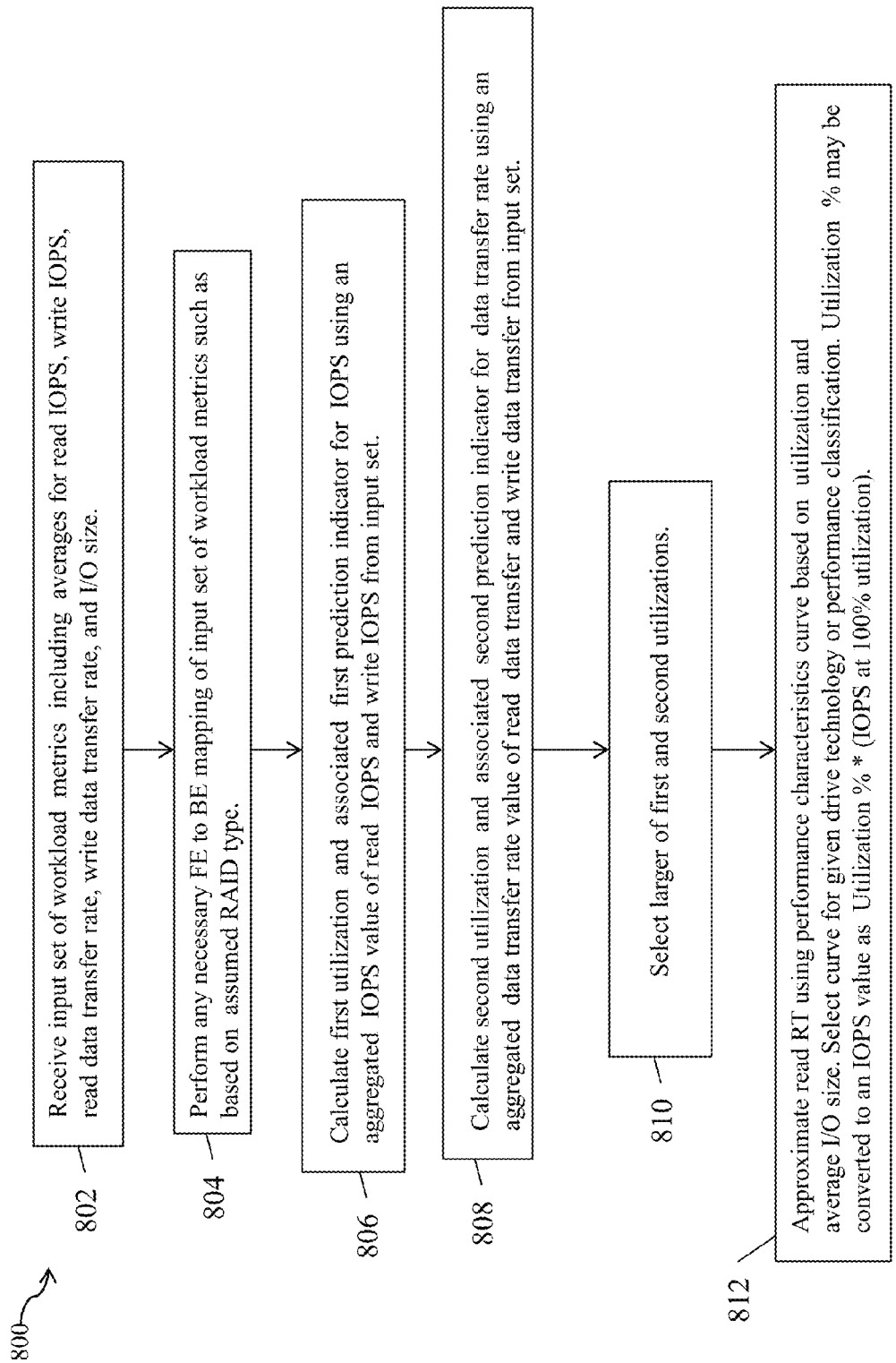

Referring to FIG. 12, shown is a flowchart of processing steps as may be performed in an embodiment in accordance with techniques herein for use in modeling throughput limits. The step of the flowchart 800 summarize processing as just described above as may be performed in connection with using one of the throughput limit models for predicting a utilization %, a RT and a strength prediction indicator regarding overload or no overload. As also noted above, the steps of FIG. 12 may be performed first with respect to the BE and then also with respect to the FE. An embodiment may also optionally only perform such modeling and processing for the BE. In connection with the BE, an embodiment may use the RT calculated in step 812 below to estimate the read miss RT for the model as the RT contribution by the FE may be deemed insignificant since the BE tends to be the significant limiting factor for performance. Also, an embodiment may also perform only some of the steps in connection with the flowchart of FIG. 12 with respect to the FE. For example, an embodiment may determine FE utilization and omit further steps related to determining a FE RT contribution. The reported utilization by the model may be the maximum of the FE and BE (e.g., representing the maximum utilization of any component on the I/O paths of the FE and BE). In step 802, an input data set of workload metrics is received which includes average read IOPS, average write IOPS, average read data transfer rate, average write data transfer rate, and average I/O size. In step 804, any needed FE to BE mapping of the input data set may be performed such as based on assumed RAID type for a BE model being utilized. In step 806, a first utilization and associated first prediction indicator (e.g., weak, strong) may be determined using the IOPS throughput limit model and an aggregated IOPS value that is the sum of the read IOPS and the write IOPS from the input data set. In step 808, a second utilization and associated second prediction indicator (e.g., weak, strong) may be determined using the data transfer throughput limit model and an aggregated data transfer value that is the sum of the read data transfer rate and the write data transfer rate from the input data set. In step 810, the larger of the first and second utilization rates may be selected. In step 812, the RT is approximated using the performance characteristic curve for the appropriate drive technology being modeled whereby the RT is determined from the curve based on the utilization and the average I/O size of the input data set. For example, if the utilization % selected in step 810 is based on the IOPS throughput limit model, the utilization % may be converted to an IOPS value used with the performance curve to determine RT (e.g., utilization %*(#IOPS at 100% utilization)). As noted above, the RT estimated in step 812 in connection with the BE may be used as an estimate of the read RT for the model.

With reference back to FIG. 11B, a fault may be determined for a given model if overload is not reported (no overload) for a given actual workload in the major measurements and the model indicated for the same workload that overload was strongly predicted (e.g., if workload falls into area 722 and no overload is reported). A fault may also be determined for a given model if overload is reported for a given actual workload in the major measurements and the model indicated for the same workload that no overload was strongly predicted (e.g., if workload falls into area 730 and an overload is reported).

What will now be described is processing that may be performed in an embodiment in connection with identifying a drive technology of one or more target physical devices (PDs), or more generally, a unit of storage, based upon observed performance metric(s). As described herein, the drive technology, or more generally the performance classification, of physical storage upon which data may be located may not be known. This may be the case, for example, where the data movement optimization techniques are performed in a first data storage system with respect to PDs of a second data storage system. Information regarding physical performance characteristics of the PDs of the second data storage system may not be provided or otherwise known to the first data storage system. As a result, alternative techniques may be used to identify aspects related to performance, such as drive technology or performance classification, of the PDs of the second data storage system through experimentation and observed performance. Based upon observed performance metrics, such as in connection with observed RTs, I/O throughput (e.g., IOPS rate, I/Os per second or other unit of time), and the like, in response to I/Os sent to the one or more PDs of the external second data storage system, techniques may be performed to assign a drive technology to the one or more PDs of the external second data storage system.

As described in more detail below, drive technology identification may be performed by establishing a closest-fit with a finite set of candidate drive technologies, based on drive technology profiles for the candidate drive technologies, and a continuous series of observations of IOPS rates and associated RRM RT (random read miss response time). The drive technology profiles may include values for metrics, such as the RRM RT and others, which are characteristic of known drive technologies. For example, a profile for a flash storage tier or flash drive technology may include a best-case or lowest expected RRM RT that may be expected for such flash drives. The observed IOPS rate and RRM RT may be obtained in connection with I/Os that may be issued using controlled testing conditions (e.g., also referred to as exploratory I/Os generated for the specific purposes of such testing for observed performance metric(s)), or alternatively, where the I/Os are actual I/Os received at the data storage system such as from a host requiring servicing. In this latter case, the I/Os used in testing to obtain observed performance metrics are those received from a host or other data storage system client and thereby such I/Os used in testing are not characterized as exploratory or generated for the special case of testing to determine the drive technology. Using such non-exploratory I/Os to obtain observed performance values allows the drive technology to be established without using the more stringent controlled testing environment/conditions with exploratory I/Os.

In some embodiments, each drive technology profile may include a characteristic best-case RRM RT (e.g., a lowest or minimally expected RRM RT value for this drive technology), and may include other criteria used for drive identification such as, for example, the maximum number of IOPS possible per drive and/or the maximum data transfer rates possible per drive. When examining an observed IOPS and/or RRM RT measurement, the profiles may be used as follows. The profile with the lowest (minimum) characteristic best-case RRM RT that is equal to or greater than the observed RRM RT is determined. In this manner, the RRM RT may be characterized as primary criteria used in determining a drive technology. As described below, the values of maximum IOPS may be used as secondary criteria. If there is no such drive technology identified, and information is available about the number of physical drives underlying the measured unit of storage, then an attempt is made to find the drive technology for which the observed RRM RT best fits the expected RRM RT for the specified load. For some observations, no adequately close match will be made, and the observed RRM RT may not contribute further to the understanding of the underlying drive technology (e.g., this observed RRM RT may be ignored or filtered out). It is important to note that an embodiment may optionally omit use of drive count information and/or operate without additional criteria in the drive technology profiles such as for the maximum throughput limits. In this case, the embodiment may rely, for example, solely on observed RRM RT value as the metric to differentiate between different drive technologies. In order to identify a given drive technology having a particular best-case characteristic RRM RT as included in the drive technology's associated profile, techniques herein may rely on obtaining observed RRM RT values (e.g., as may be obtained with loads that are light or minimal) which are below the characteristic best-case RRM RT of all other profiles having best-case RRM RTs that are more than the particular best-case characteristic RRM RT.

If the identification process is driven using controlled testing with exploratory I/Os, then it is relatively straightforward. With controlled testing, the system controls the rate and type of the I/Os generated and may therefore generate a set of I/Os for testing purposes having a predetermined desired set of characteristics (e.g., in accordance with a very low or light IOPS rate, where read misses are generally expected, and the like). Furthermore, it is assumed that there are no other I/O activities taking place on the storage system being evaluated to thereby use data storage system resources for purposes other than identification of drive technology. For controlled testing using exploratory I/Os, the generated exploratory I/Os may be read operations that can reasonably be expected to be misses and the response times for such I/Os may be observed. Observations at low I/O rates produce best-case response times (e.g., best case RRM RTs) which can then be used to determine the best-matching drive technology from the list of candidate technologies and associated profiles. In this case an assessment can be made with high confidence quickly.

Alternatively, some embodiments using the techniques herein may not perform such controlled testing using exploratory I/Os generating having a particular predetermined pattern/set of characteristics. For example, as described above, the I/Os may be those received from a client and not generated with predetermined characteristics for the particular testing purposes. Also, resources of the data storage system including the storage for which drive technology identification is being performed may be used in connection with other processing besides the testing. Thus, the resources and workload of the data storage system may be the collective result of this testing as well as the other processing so that an observed measurement may be interpreted inaccurately (e.g. observed RT may be high due to cache or other resources being used for other processing rather than testing and a high observed RT may result in improperly selecting a slower performing drive technology based on the observed RT). If controlled testing is not possible, the drive technology identification process may be more complicated. For example, the opportunity to observe low RRM RTs may not arise quickly, there may be inaccuracies in the actual drive-level read and write rates associated with a measurement, there may be additional unknown activities taking place on the storage system that is being evaluated that is reflected in an observed measurement, and the like.

Since the process of identifying the technology type may take a non-trivial amount of time, and there may be changes to the assessment over time, the identification process described herein may maintain a measure confidence of the current assessment or assignment of a drive technology. This confidence measure may be used to influence other measures of confidence reported back to any user of storage characteristics or performance predictions made by the model. To deal with the potential sources of fluctuations in apparent drive technology, related either to real changes in unmeasured loads that are in fact influencing the response time of the measured unit or to inaccuracies of measurements of observed load or to actual changes in the underlying technology, the process provides for identifying a drive technology over a period of time and also provides for an amount of resistance to quick changes once a drive technology has been "elected". The foregoing and other aspects of the techniques herein are described in more detail below.

A scoring technique may be used whereby, for each candidate drive technology that may be assigned to a particular PD or other unit of storage, a score is maintained. The score may be represented as a count of the number of votes that the corresponding technology has received as being the possible drive technology for a given unit of storage, such as one or more PDs providing physical storage. All technologies for a given unit of storage to be characterized start with a score of zero. As the process of continuously observing performance for the unit of storage proceeds, the scores for each technology are updated. Each time a given technology receives a vote, the score counter for that technology is incremented (e.g., unless it has reached a specified maximum value or maximum threshold as may be specified in an embodiment) and the scores for all other technologies are decremented (e.g., unless they have already reached a specified minimum value or minimum threshold such as zero).

At any given time, the most likely technology underlying the measured storage unit (e.g., one or more PDs) is the technology with the highest score. A measure of confidence in that assessment may be represented based on the magnitude of the score advantage compared to the next highest scoring technology (e.g., difference between closest score pairs). A technology may be considered "elected" or assigned to the storage when its confidence level reaches a certain level such as a specified threshold election score.

Once a technology is elected, the algorithm may track the maximum IOPS rate at which the best-case RRM RT (or lower) was observed. In this manner, the maximum IOPS rate may be used as secondary level criteria in connection with voting for a particular technology rather than just make a decision regarding the best matching profile/drive technology and thus casting a vote for this technology based on the observed RT. The foregoing tracked maximum IOPS rate value at which the best-case RRM RT (or lower) is observed may be used to avoid false identifications of a lower performing technology (having a RRM RT that is more than the currently elected technology) when an observed RRM RT is higher than the best-case characteristic RRM RT of the elected technology, but lower than the best-case characteristic RRM RT associated with a lower performing technology (than the elected technology). In such cases, voting may be characterized as by-passed whereby there is no vote added to the score of the lower performing technology (having the higher characteristic RRM RT than the elected technology) if the IOPS rate associated with the observed RRM RT is higher than the maximum IOPS rate at which the best-case RRM RT (or lower) was observed for the elected technology (during the course of its current term as the elected technology).

The maximum IOPS rate (e.g., which is observed along with an associated RRM RT that is at or below the best case RRM RT, which is tracked/saved once a drive technology is elected, and which is used in connection with such vote bypassing as just described) may be modified to an increased observed value when such an observed IOPS rate is more than the current maximum IOPS rate and also has an associated "qualifying" observed RRM RT (e.g., where the observed RRM RT is equal to or less than the RRM RT at which the current maximum IOPS rate was previously obtained). For observed RRM RTs above the characteristic RRM RT for the elected drive technology having an associated IOPS rate below the maximum IOPS rate previously observed with less than the characteristic RRM RT, the saved maximum IOPS rate may be lowered more slowly, as an added source of inertia for the assessment (needed, in turn, to deal with the sources of fluctuations mentioned earlier). An embodiment may perform the foregoing to avoid thrashing of the above-mentioned value maintained regarding saved maximum IOPs. An embodiment may perform any suitable processing to lower the saved maximum IOPS rate (associated with the best case RRM RT) more slowly. For example, an embodiment may reduce the saved maximum IOPS value in an amount that is proportional to the difference between the currently observed IOPS and the saved maximum IOPS.

Figure 13:
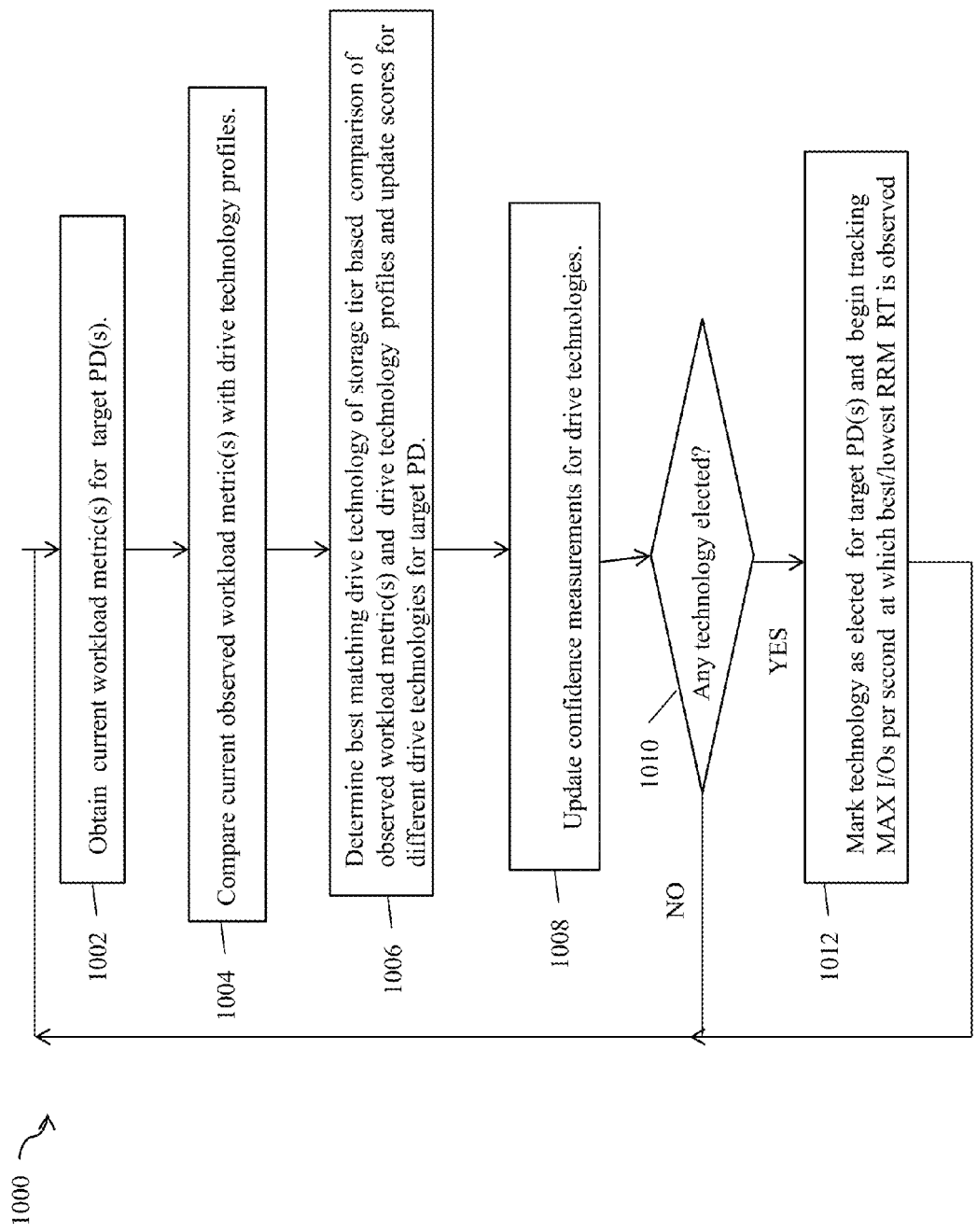
Figure 14:
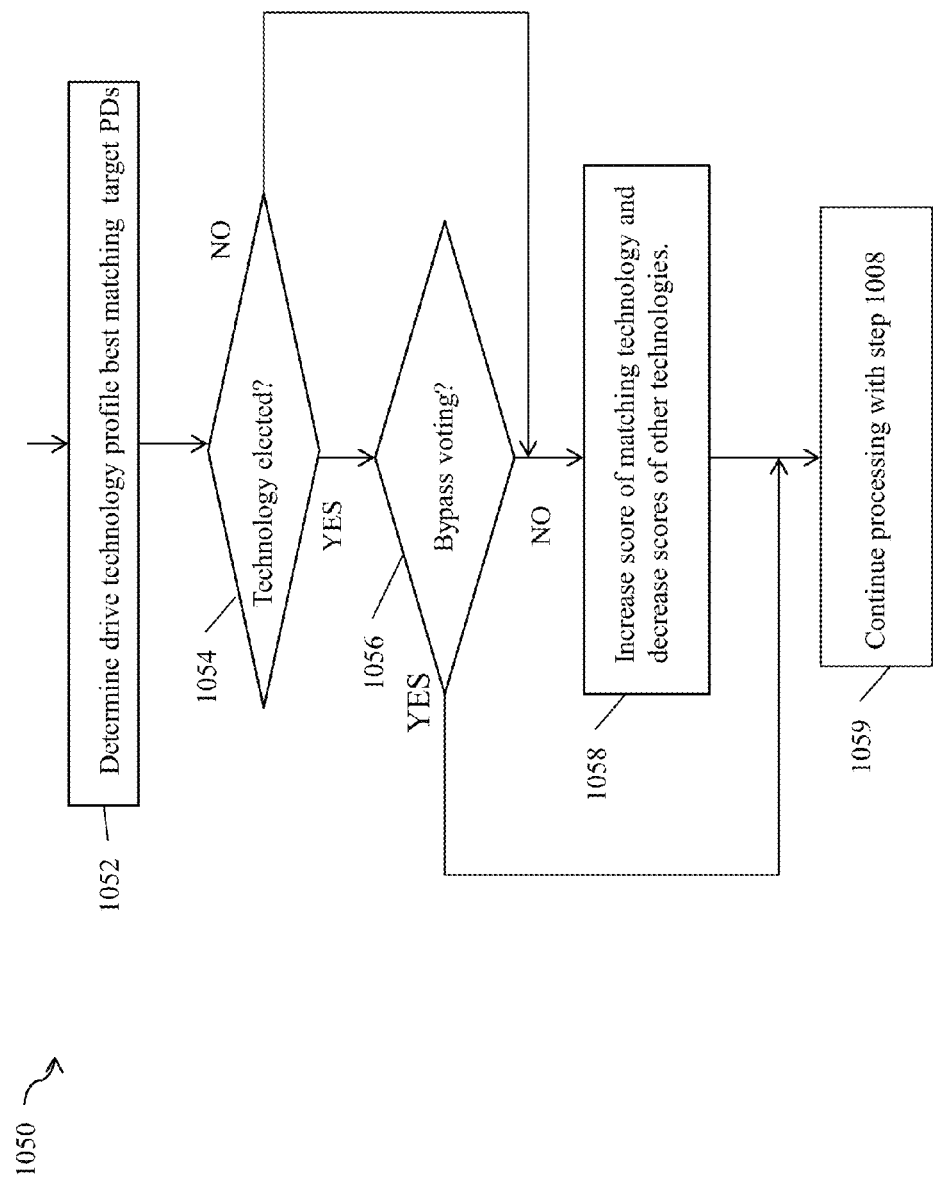

Referring to FIGS. 13 and 14, shown are flowcharts of processing steps as may be performed in an embodiment in accordance with techniques herein for identifying or assigning a drive technology to a unit of storage such as one or more PDs, or portions thereof. The flowcharts of FIGS. 13 and 14 summarize processing described above. In step 1002, the current workload metric(s) are obtained for the unit of storage, such as one or more PDs, for which this identification processing is being performed. As described above, the workload metrics may include RRM RT, IOPS rate, and the like, as generated in connection with back-end related performance data such as may be obtained using the major/minor technique described herein. In step 1004, the current observed workload metric(s) may be compared to values specified in the drive technology profiles. At step 1006, the best matching drive technology is determined based on the comparison performed in step 1004. Step 1006 may also include updating the scores for the different drive technologies for the target PD or unit of storage for which the identification processing is being performed. At step 1008, the confidence measurements for the drive technologies may be updated. At step 1010, a determination is made as to whether any of the scores have reached the specified election threshold. If step 1010 evaluates to no meaning no score has yet reached the election threshold, no technology is elected and processing proceeds to step 1002. If step 1010 evaluates to yes, processing proceeds to step 1012 where the technology elected is marked as such for the target PD(s) or unit of storage being evaluated. At step 1012, processing may also be performed to commence tracking the maximum I/Os per second obtained which also has an associated RRM RT that is less than the best-case RRM RT in the profile of the elected technology. Control proceeds to step 1002.

Referring to FIG. 14, shown is a flowchart 1050 providing additional detail regarding step 1006 in which a best matching technology is selected and scores may be accordingly updated. As illustrated and described herein, once a first technology has been elected, secondary criteria may be used to avoid voting for a particular technology other than the elected drive technology. At step 1052, the drive technology having the best matching profile for the observed RRM RT as the primary selection criteria is selected. At step 1054, a determination is made as to whether there is currently a technology elected for the PD(s) or unit of storage (for which identification processing is being performed). If step 1054 evaluates to no, control proceeds to step 1058 to increase the score of the matching technology and decrease the scores of the other technologies. As described herein, step 1058 scores may be subject to established maximum and minimum (e.g., 0) threshold values so that once a score reaches either established threshold, the score may not be further adjusted beyond the threshold reached. In this manner, the established maximum and minimum threshold values define an inclusive range of possible score values. From step 1058, processing continues with step 1008 of FIG. 13.

If step 1054 evaluates to yes, control proceeds to step 1056 where a determination is made as to whether to by-pass voting using secondary criteria. As described above, voting may be by-passed (e.g., causing step 1056 to evaluate to yes or true) if the matching technology selected in step 1052 is not the same as the elected technology, the observed RRM RT is higher than the best-case RRM RT in the elected profile and also lower than the best-case RRM RT of the matching technology, and the IOPS rate observed is greater than the maximum IOPS rate tracked for the elected technology (where the max IOPS rate is associated with a RRM RT that is equal to or lower than the best-case RRM RT of the elected technology profile). In this case if step 1056 evaluates to yes, processing proceeds to step 1059 and thus by-passes the voting process (of step 1058) and does not increase the score for the matching technology.

In connection with modeling the external data storage system over time, the foregoing provides for determination and selection of a particular RAID type and drive technology. Furthermore, once a particular RAID type and drive technology have been determined through the modeling techniques herein, one of the different BE throughput limit models may be selected whereby an embodiment may maintain a different BE throughput limit model for each unique possible combination of drive technology and RAID type. The foregoing may be modeled for each LUN and over time, such determinations regarding RAID type, drive technology and which of the modeled BE through limit models best matches the particular LUN's observed performance for varying workloads may be determined. Additionally, an embodiment may provide confidence levels/measurements for the different possible RAID types, throughput limits modeled and drive technology candidates at different points in time.

It should be noted that an embodiment may maintain and track the different models described herein per LUN of interest having its data stored on PDs of the external data storage system. Additionally or alternatively, an embodiment may maintain and track the different models described herein for a set of LUNs thereby providing for FE and BE modeling for the set of LUNs collectively.

Figure 15:
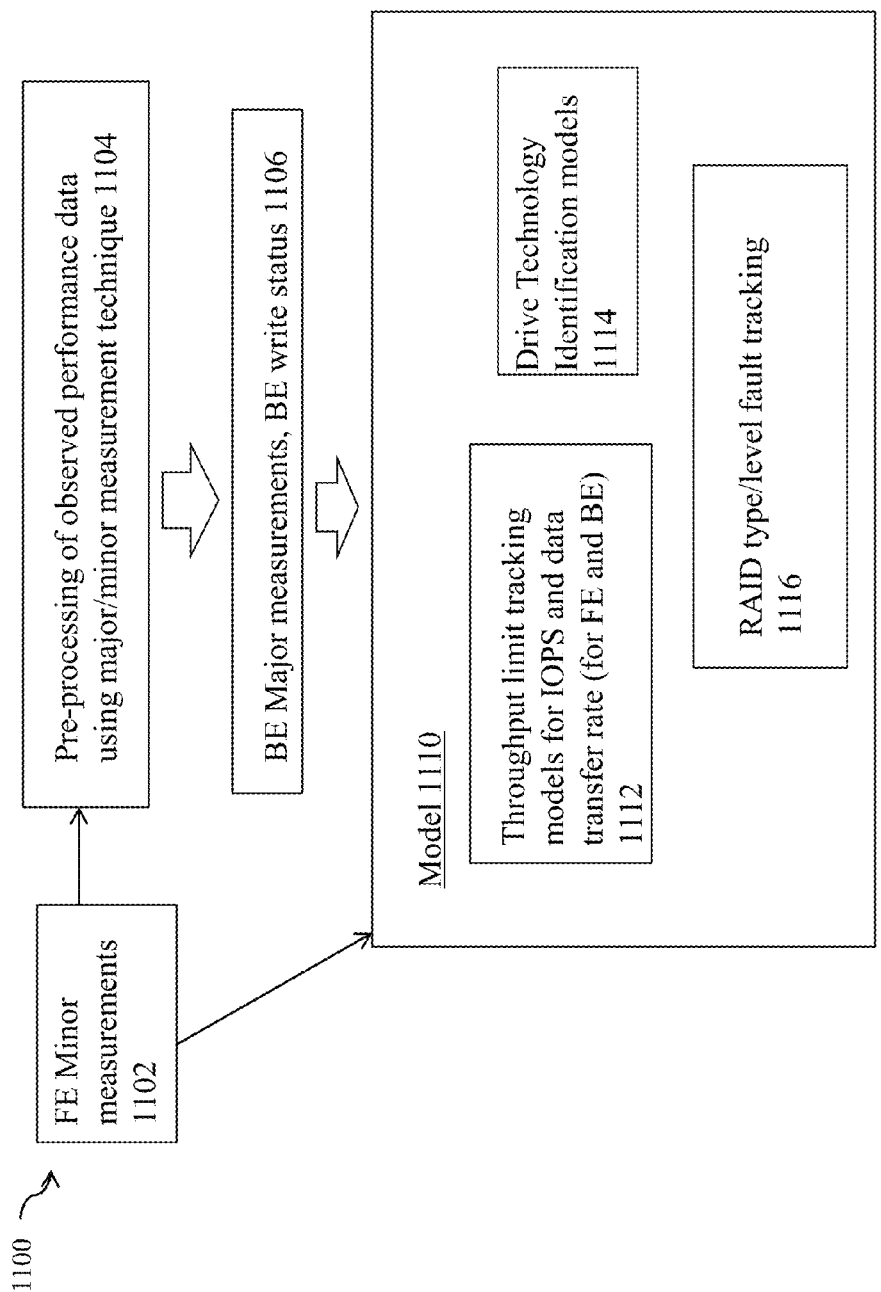
FIG. 15 is an example illustrating data flow of techniques herein to build and refine a model for an external data storage system.

Referring to FIG. 15, shown is a data flow illustrating use of techniques herein to build and refine the model 1110 for the external data storage system. The example 1100 includes FE minor measurements 1102 which are provided as an input to preprocessing in step 1104. In this example, the data of 1102 may be in terms of FE observations as opposed to those made at a point in the BE. Step 1104 includes processing the FE minor measurements 1102 using the major/minor measurement technique described above to generate as an output BE major measurements and a BE write status 1106 for each set of major measurements. The BE major measurements and associated BE write status 1106 is provided as an input to the model 1110. Additionally, the FE minor measurements 1102 are also directly input to the model 1110 as such data is needed for use with any desired FE modeling. The model 1110 generally represents all the modeling performed for the entire external data storage system. In one aspect model 1110 may be viewed as including many smaller models including throughput limit tracking models for IOPS and data transfer rate (for both FE and BE) 1112, drive technology identification models 1114 and RAID type/level fault tracking 1116. Element 1112 may represent one or more models that may be maintained and tracked for each LUN of interest. For example, consistent with description herein, assume that LUN A may be stored on PDs which are FC or EFD having either a RAID-1 or RAID-5 configuration. In this manner, element 1112 represents the 4 different BE throughput limit tracking models maintained for LUN A, one model for each possible unique combination of RAID type and drive technology. Additionally a single model instance for through limit tracking 1112 may be maintained for the FE modeled components related to I/Os directed to LUN A. Element 1114 may represent information maintained for each of the two possible drive technology types of EFD and FC (e.g., as described in connection with FIGS. 13 and 14). Element 1116 may represent the processing performed to track and maintain information related to RAID type/level fault tracking based on incorrect model predictions regarding overload. Thus, FIG. 15 illustrated a high level view of processing in connection with building/constructing the external data storage system model and also refining such model over time as additional minor measurement data is obtained.

It should be noted that the example 1100 illustrates a data flow whereby the original input data 1102 is in the form of FE measurements which may be processed to obtain BE measurement data as represented by 1106. Alternatively, an embodiment may directly obtain BE measurement data and may input this directly into the model as an alternative to using the major/minor measurement technique to indirectly obtained the BE measurement data of 1106.

Figure 16:
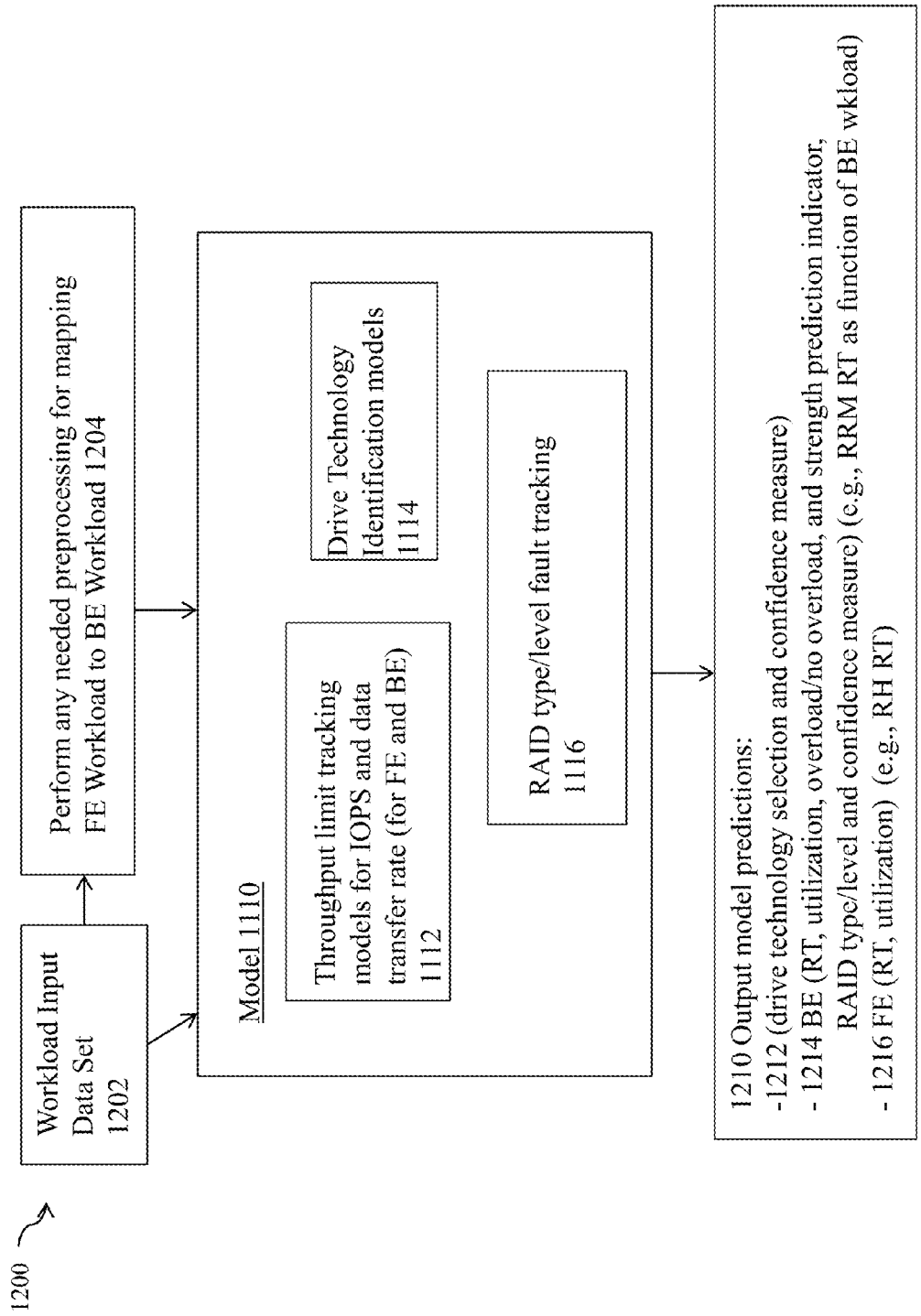
FIG. 16 is an example illustrating use of a data storage system model to output predictions in an embodiment in accordance with techniques herein.

Referring to FIG. 16, shown is an example illustrating use of the model 1110 to output predictions in accordance with techniques herein. In the example 1200, the workload input data set 1202 may be preprocessed in 1204 to obtain BE workload data. As described herein, step 1204 may include mapping the FE workload data to BE workload data based on particular RAID type. Thus, the output of 1204 may be BE workload data which is input to the model 1110 along with the original workload input data set 1202 (which in this example include performance data based on FE observed read and writes). The workload data set 1202 may be made with respect to I/Os directed to a particular LUN which has been modeled using 1110. Using the model 1110, outputs of 1210 may be produced for the particular LUN and may include drive technology selection and associated confidence measure 1212, BE modeled outputs 1214 and FE modeled outputs 1216. Element 1212 may include the result of selecting the modeled drive technology currently having the highest score and which may be elected and providing a confidence measure regarding the drive technology selection. Element 1214 may include a RT, utilization, indication of overload or no overload and a strength prediction indicator (regarding the overload/no overload prediction). Element 1214 for modeled BE predictions may also include a RAID type/level and associated confidence measure such as based on the particular throughput limit tracking model RAID level having the least faults. It should be noted that the RT of 1214 may generally represent that portion of the total RRM RT (as a function of BE workload) which is due to the BE components. Element 1216 representing the modeled FE predictions may include a RT and a utilization. The RT of 1216 may represent that portion of the total RT which is due to the FE components and may also be characterized as modeling the average Read hit (RH) RT. To obtain a total average RT value for RRM RT, the RT of 1214 may be added to the RT of 1216. However, for modeling simplification, the RT value of 1214 may approximate an average modeled RRM RT since the RT contribution of 1216 by the FE is typically small relative to the RT contribution of 1214.

It should be noted that such BE major measurements of 1106 may be further processed within the model 1100 such as to convert or map BE major measurements 1106 to another set of values based on RAID type/level. For example, consider using the BE major measurements as input to the throughput limit tracking models for IOPS and data transfer rate 1112 for the BE. Each of the models 1112 varies with RAID type and drive classification. For example, assume there is a first throughput model for RAID 1, drive technology 1 and a second throughput model for RAID-5 and drive technology 1. In this manner, a set of BE major measurements may be translated to a second set of measurements for use with the throughput limit model based on RAID-1 and drive technology. The set of BE major measurements may also be translated to a third different set of measurements for use with the throughput limit model based on RAID-5 and drive technology. With reference back to FIG. 15, generally the set of BE major measurements 1106 as may be generated using the major/minor technique herein may be input to processing, such as described in connection with FIGS. 13 and 14, and used to update selection of drive technology in connection with drive technology identification models 1114 and also for updating throughput limit tracking models 1112. As noted above, the BE major measurements may be further processed for use with the models of 1112 for the particular RAID type.

With reference back to FIGS. 5 and 6, the techniques herein for modeling the external data storage system may be performed by the data storage optimizer or other component, for example, by the first data storage system 2804 of FIG. 5 and the appliance 2904 (which may also generally be referred to as a data storage system) of FIG. 6. Information such as the drive technology and RAID type or level, as well as other information predicted by the model may be used by the data storage optimizer in connection with performing data storage optimizations. For example, as described elsewhere herein, the one or more PDs of the external storage system may include some or all of the provisioned storage for a set of one or more logical devices to which I/Os are directed. Techniques herein may be used to construct a model in accordance with observed performance data for the one or more PDs whereby the mode is then used to predict the drive technology, or more generally performance classification, and RAID type of the one or more PDs of the external storage system. Such information may be used in connection with determining whether to perform a data movement optimization whereby the drive technology of the external data storage system's PDs may be a characteristic of a performance classification used in combination with one or more other drive technologies or other performance classifications in connection with determining where to locate different data portions based on their corresponding activity levels.

Additionally, an embodiment using techniques herein may also be used in combination with other modeled outputs. For example, as described in U.S. patent application Ser. No. 13/466,775 (the '775 application), filed May 8, 2012, PERFORMING DATA STORAGE OPTIMIZATIONS ACROSS MULTIPLE DATA STORAGE SYSTEMS, which is incorporated by reference herein, different discovery techniques may be used to determine a drive technology for each LUN based on using controlled testing techniques. Such a determination regarding drive technology by this or another discovery technique may be used in place of, or in combination with, the techniques herein for drive technology determination. For example, an embodiment may select a first drive technology using non-exploratory I/Os as described herein if it is not possible to achieve the restricted and controlled testing environment as may be needed in connection with using exploratory I/Os with a second discovery technique such as one described in the '775 application. An embodiment may also update and test the external data storage system model and determine faults regarding RAID type throughput model variations with every new set of actual observed workload and performance data. The actual performance results for a given workload may be compared with the predicted outcome of the model for the same given workload.

The techniques herein may be used in an embodiment where the optimizations such as data movements are performed external with respect to the data storage system subject to data movement. Performing such techniques on a primary data storage system or other component other than the data storage systems being managed provides for a global view whereby the data movement optimizations may be performed viewing multiple data storage systems as a single entity for data movement where the source may be any device location in the single entity or aggregated view, and the target may be any device location in the single entity or aggregated view (e.g. may perform data movement optimizations within a single or same DS and/or across or between different DSs within a data center or federation).

As described herein, an embodiment in accordance with techniques herein may perform any one or more of the above-mentioned techniques alone, or in combination with others. For example, an embodiment may use the techniques for data storage optimizations described herein such as to evaluate which data portions are subject to data movements in connection with storage on one or more data storage systems where the optimizer performing such optimizations is located on a host, or more generally, any component external from the data storage system(s) to which the optimizations are being applied. In some embodiments, the data storage systems may be further characterized as different unitary storage systems, and the data storage movements and evaluation of candidate data portions for such data movements may be include performing such optimizations spanning multiple physical data storage systems, such as data storage arrays. The different physical data storage systems to which the data movement optimization may be applied may be heterogeneous such as from different data storage vendors, having different PD technologies and performance classifications, and the like. As also described herein, an embodiment may have primary data storage system model an external data storage system whereby the primary data storage system may store data on the external data storage system and may also perform data storage optimizations with respect to its local PDs and also those PDs of the external system.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of data storage system modeling comprising:
   receiving, at a first data storage system, information representing a workload for performing I/O operations directed to a set of one or more logical devices having storage provisioned on a set of one or more physical devices of a second data storage system, wherein at least some of the information representing the workload is obtained by performing discovery processing to discover performance characteristics of the set of one or more physical devices, said discovery processing including:
      receiving, at the first data storage system, a plurality of I/O operations from a client directed to the set of one or more logical devices having storage provisioned on the set of physical devices of the second data storage system;
      issuing, by the first data storage system to the second data storage system, the plurality of I/O operations; and
      obtaining, at the first data storage system in response to said issuing, a set of performance data representing the workload for the plurality of I/O operations directed to the set of logical devices having storage provisioned on the set of one or more physical devices of the second data storage system; and
   modeling performance of the second data storage system in accordance with the workload.

2. The method of claim 1, wherein the plurality of I/O operations includes non-exploratory I/O operations from the client, said non-exploratory I/O operations including at least some write operations and at least some read operations.

3. The method of claim 1, wherein the modeling includes modeling performance of one or more front-end components of the second data storage system and one or more back-end components of the second data storage system.

4. The method of claim 3, further comprising:
   obtaining a plurality of input data sets for a plurality of consecutive minor measurement time periods, each of said plurality of input data sets including performance data corresponding to a different one of the plurality of consecutive minor measurement time periods, each of said plurality of inputs data sets including performance data for I/Os directed to the set of one or more logical devices having storage provisioned on the second data storage system; and
   generating, using the plurality of input data sets, a set of major measurements for a major measurement time period including the plurality of consecutive minor measurement time periods, said set of major measurements representing back end read activity data and back end write activity data of the second data storage system directed to the set of one or more logical devices.

5. The method of claim 4, wherein each of the plurality of input data sets includes a plurality of performance metrics obtained by observing performance on the first data storage system in response to issuing I/Os to the set of one or more logical devices.

6. The method of claim 5, wherein each of the plurality of inputs data sets includes an average read response time, an average read data transfer rate, an average read throughput in terms of a number of I/O operations per unit of time, an average write response time, an average write data transfer rate, and an average write throughput in terms of a number of I/O operations per unit of time.

7. The method of claim 6, wherein the plurality of consecutive minor measurement time periods includes a focal minor measurement time period and the plurality of consecutive minor measurement time periods is partitioned into a pre-range portion of the plurality of consecutive minor measurement time periods preceding the focal minor measurement and a post-range portion of the plurality of consecutive minor measurement time periods subsequent to the focal minor measurement time period.

8. The method of claim 7, wherein the back end read activity data is the average read response time, the average read data transfer rate, and the average read throughput in terms of a number of I/O operations per unit of time of one of the plurality of input data sets corresponding to the focal minor measurement time period.

9. The method of claim 7, wherein the back end write activity data is determined in accordance with a back-end write status, wherein the back-end write status is any of uncertain if there is a delayed write occurring in any minor measurement time period of the pre-range portion, sustainable if there is no delayed write in any of the plurality of consecutive minor measurement time periods, and unsustainable if there is no delayed write in the pre-range portion and there is a delayed write in any of the post range portion and focal minor measurement time period.

10. The method of claim 9, wherein the back-end write activity data is determined using one or more of the plurality of input data sets selected based on the back-end write status.

11. The method of claim 10, wherein second processing is performed if the back-end write status is any of uncertain or sustainable, said second processing including:
   selecting a first portion of the plurality of input data sets, said first portion including a first of the plurality of input data sets corresponding to the focal minor measurement time period, wherein the first portion also conditionally includes one or more of the plurality of input data sets corresponding to minor measurement time periods in the post-range portion if the average write data transfer rate and the average write throughput for each of the one input data sets corresponding to a minor measurement time period of the post-range portion are less than corresponding values in the one input data set corresponding to the focal measurement time period; and
   determining said set of major measurements by averaging said first portion of the plurality of input data sets.

12. The method of claim 10, wherein second processing is performed if the back-end write status is unsustainable, said second processing including:
   selecting a first portion of the plurality of input data sets, said first portion including a first of the plurality of input data sets corresponding to the focal minor measurement time period and one or more of the plurality of inputs data sets corresponding to minor measurement time periods included in the post-range portion, wherein the first portion also conditionally includes one or more of the plurality of input data sets corresponding to minor measurement time periods in the pre-range portion if the average write data transfer rate, and the average write throughput for each of the one or more input data sets corresponding to a minor measurement time period of the post-range portion are more than corresponding values in the one input data set corresponding to the focal measurement time period; and determining said set of major measurements by averaging said first portion of the plurality of input data sets.

13. The method of claim 4, wherein front-end limit tracking is performed for data transfer rate and I/O throughput for front-end components of the second data storage system used in connection with servicing read and write I/O operations directed to the set of one or more logical devices having storage provisioned on the second data storage system, said front-end limit tracking modeling upper bounds for the front-end components in terms of maximum data transfer rate and maximum I/O throughput, and wherein back-end limit tracking is performed for data transfer rate and I/O throughput for back-end components of the second data storage system used in connection with servicing read and write I/O operations directed to the set of one or more logical devices having storage provisioned on the second data storage system, said back-end limit tracking modeling upper bounds for the back-end components in terms of maximum data transfer rate and maximum I/O throughput.

14. The method of claim 13, wherein the plurality of inputs data sets is processed by the front-end limit tracking and tracks a highest data transfer rate without overload, a lowest data transfer rate with overload, a highest I/O throughput without overload and a lowest I/O throughput with overload, and wherein strong prediction ranges are associated with I/O throughput values larger than the lowest I/O throughput with overload or smaller than the highest I/O throughput without overload, and wherein strong prediction ranges are associated with data transfer rates larger than the lowest data transfer rate with overload or smaller than the highest data transfer rate without overload.

15. The method of claim 14, wherein, for a given workload directed to the set of one or more logical devices having storage provisioned on the set of one or more physical devices of the second data storage system, said modeling uses limits tracked by the front-end limit tracking to predict one or more values including a front-end component utilization level.

16. The method of claim 13, wherein the set of one or more physical devices is any one of a plurality of different candidate configurations having a unique combination of drive technology and RAID level, wherein the back-end limit tracking is performed for each of the plurality of different candidate configurations and wherein a plurality of sets of major measurements for a plurality of major measurement time periods is processed in connection with the back-end limit tracking whereby the back-end limit tracking tracks, for each of the plurality of different candidate configurations, a highest data transfer rate without overload, a lowest data transfer rate with overload, a highest I/O throughput without overload and a lowest I/O throughput with overload, and wherein strong prediction ranges are associated with I/O throughput values larger than the lowest I/O throughput with overload or smaller than the highest I/O throughput without overload, and wherein strong prediction ranges are associated with data transfer rates larger than the lowest data transfer rate with overload or smaller than the highest data transfer rate without overload.

17. The method of claim 16, wherein, for a given workload directed to the set of one or more logical devices having storage provisioned on the set of one or more physical devices of the second data storage system, said modeling uses limits tracked by the back-end limit tracking to predict, for each of the plurality of different candidate configurations, a back-end component utilization level, a response time denoting a portion of total response time due to the back-end components processing the given workload, indication of overload or no overload status, and associated confidence level of strong or weak regarding the indication of overload or no overload, and wherein fault tracking is performed for overload predictions made with respect to limits tracked for each of the plurality of different candidate configurations and said modeling predicts that said set of one or more physical devices has a RAID level associated with a first of the plurality of different candidate configurations having a least number of faults.

18. The method of claim 1, wherein said set of one or more physical devices is one of a plurality of candidate drive technologies and a score is maintained by said modeling for each of the candidate drive technologies as additional information regarding different workloads are observed in connection with performing I/O operations to the set of one or more logical devices over a period of time, wherein said modeling determines said score for each of the candidate drive technologies in accordance with criteria including response time and said modeling generates a predicted drive technology selection and an associated confidence measure, said predicted drive technology selection being a prediction regarding a drive technology of the set of one or more physical devices based on which of the plurality of candidate drive technologies has a highest score relative to others of the plurality of candidate drive technologies.

19. A non-transitory computer readable medium comprising code stored thereon for data storage system modeling, the non-transitory computer readable medium comprising code for:

receiving, at a first data storage system, information representing a workload for performing I/O operations directed to a set of one or more logical devices having storage provisioned on a set of one or more physical devices of a second data storage system, wherein at least some of the information representing the workload is obtained by performing discovery processing to discover performance characteristics of the set of one or more physical devices, said discovery processing including:

receiving, at the first data storage system, a plurality of I/O operations from a client directed to the set of one or more logical devices having storage provisioned on the set of physical devices of the second data storage system;

issuing, by the first data storage system to the second data storage system, the plurality of I/O operations; and obtaining, at the first data storage system in response to said issuing, a set of performance data representing the workload for the plurality of I/O operations directed to the set of logical devices having storage provisioned on the set of one or more physical devices of the second data storage system; and modeling performance of the second data storage system in accordance with the workload.

20. A system comprising:
a host;
a first data storage system; and
a second data storage system having storage accessed from the first data storage system; and
wherein the first data storage system includes a nontransitory computer readable medium comprising code stored thereon for:
receiving, at the first data storage system, information representing a workload for performing I/O operations directed to a set of one or more logical devices having storage provisioned on a set of one or more physical devices of the second data storage system, wherein at least some of the information representing the workload is obtained by performing discovery processing to discover performance characteristics of the set of one or more physical devices, said discovery processing including:
receiving, at the first data storage system, a plurality of I/O operations from the host directed to the set of one or more logical devices having storage provisioned on the set of physical devices of the second data storage system;
issuing, by the first data storage system to the second data storage system, the plurality of I/O operations; and
obtaining, at the first data storage system in response to said issuing, a set of performance data representing the workload for the plurality of I/O operations directed to the set of logical devices having storage provisioned on the set of one or more physical devices of the second data storage system; and
modeling performance of the second data storage system in accordance with the workload, wherein the plurality of I/O operations includes non-exploratory I/O operations from the host, said non-exploratory I/O operations including at least some write operations and at least some read operations.

* * * * *